United States Patent
Chen et al.

(10) Patent No.: US 10,341,061 B2
(45) Date of Patent: Jul. 2, 2019

(54) HYBRID AUTOMATIC REPEAT REQUEST TIMING FOR REDUCED TRANSMISSION TIME INTERVALS

(71) Applicant: QUALCOMM Incorporated, San Diego, CA (US)

(72) Inventors: Wanshi Chen, San Diego, CA (US); Peter Gaal, San Diego, CA (US); Shimman Arvind Patel, San Diego, CA (US); Yongbin Wei, La Jolla, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 15/444,875

(22) Filed: Feb. 28, 2017

(65) Prior Publication Data

US 2017/0288819 A1 Oct. 5, 2017

Related U.S. Application Data

(60) Provisional application No. 62/315,601, filed on Mar. 30, 2016.

(51) Int. Cl.
*H04L 1/18* (2006.01)
*H04W 72/04* (2009.01)
(Continued)

(52) U.S. Cl.
CPC .......... *H04L 1/1812* (2013.01); *H04L 1/1854* (2013.01); *H04L 1/1887* (2013.01);
(Continued)

(58) Field of Classification Search
CPC ... H04L 1/1812; H04L 1/1887; H04L 1/1854; H04W 72/0413; H04W 72/0466; H04W 72/0446; H04W 72/1284; H04W 74/02
See application file for complete search history.

(56) References Cited

U.S. PATENT DOCUMENTS

2016/0095135 A1* 3/2016 Lv .................. H04W 72/12
370/336
2016/0255611 A1* 9/2016 Damnjanovic ..... H04W 72/042
370/330
(Continued)

FOREIGN PATENT DOCUMENTS

EP       2056616 A1    5/2009

OTHER PUBLICATIONS

CMCC, "Discussion on TTI Shortening for Latency Reduction," 3GPP TSG RAN WG1 Meeting #84, R1-160499, St. Julian's, Malta, Feb. 15-19, 2016, 3 pgs., XP051063821, 3rd Generation Partnership Project.
(Continued)

*Primary Examiner* — Min Jung
(74) *Attorney, Agent, or Firm* — Anthony R. Morris

(57) ABSTRACT

Systems, methods, and apparatuses are described for wireless communication, including for hybrid automatic repeat request (HARQ) feedback in a system that supports communications using transmission time intervals (TTIs) of different durations. A base station may identify a user equipment's (UE) capability to provide HARQ feedback for transmissions that use TTIs of a shorter duration relative to other TTIs supported in the system. The base station may select a HARQ timing mode based on the capability of the UE and may indicate the selected HARQ timing mode to the UE. The base station may then transmit one or more data transmissions to the UE using the reduced TTIs. The UE may respond with HARQ feedback based on the HARQ timing mode. The HARQ timing mode may be based on different response times based on the location of the data transmission within a TTI or relative to data transmission in other TTIs.

30 Claims, 19 Drawing Sheets

(51) Int. Cl.
*H04W 72/12* (2009.01)
*H04W 74/02* (2009.01)
*H04L 5/00* (2006.01)

(52) U.S. Cl.
CPC ... *H04W 72/0413* (2013.01); *H04W 72/0446* (2013.01); *H04W 72/0466* (2013.01); *H04W 72/1273* (2013.01); *H04W 72/1284* (2013.01); *H04W 74/02* (2013.01); *H04L 5/0044* (2013.01); *H04L 5/0055* (2013.01)

(56) References Cited

U.S. PATENT DOCUMENTS

2017/0223670 A1* 8/2017 Chen ............... H04L 5/0053
2017/0290008 A1* 10/2017 Tooher ............ H04L 1/0007

OTHER PUBLICATIONS

Huawei et al., "Short TTI for DL Transmissions," 3GPP TSG RAN WG1 Meeting #84, R1-160292, St. Julian's, Malta, Feb. 15-19, 2016, 7 pgs., XP051064110, 3rd Generation Partnership Project.

ISA/EP, International Search Report and Written Opinion of the International Searching Authority, Int'l Application No. PCT/US2017/020187, dated Aug. 2, 2017, European Patent Office, Rijswijk, NL, 19 pgs.

NTT Docomo, Inc., "Discussions on TTI Shortening," 3GPP TSG RAN WG1 Meeting #84, R1-160966, St. Julian's, Malta, Feb. 15-19, 2016, 6 pgs., XP051054273, 3rd Generation Partnership Project.

ISA/EPO, Partial International Search Report of the International Searching Authority, Int'l. App. No. PCT/US2017/020187, dated Jun. 12, 2017, European Patent Office, Rijswijk, NL, 16 pgs.

* cited by examiner

HYBRID AUTOMATIC REPEAT REQUEST TIMING FOR REDUCED TRANSMISSION TIME INTERVALS

CROSS REFERENCES

The present Application for patent claims priority to U.S. Provisional Patent Application No. 62/315,601, entitled "Hybrid Automatic Repeat Request Timing For Reduced Transmission Time Intervals," filed Mar. 30, 2016, assigned to the assignee hereof.

BACKGROUND

The following relates generally to wireless communication and more specifically to hybrid automatic repeat request (HARQ) timing for reduced transmission time intervals (TTIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

Wireless multiple-access technologies have been adopted in various telecommunication standards to provide a common protocol that enable different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In an LTE system, a UE may transmit HARQ feedback information to facilitate error correction and data transmission. HARQ processing procedures may, however, create delays between reception of downlink information and HARQ feedback transmission. These delays may result in increased latency and a decrease in overall system performance. Certain HARQ procedures also may not account for communications that use TTIs of different durations.

SUMMARY

A base station may identify a user equipment's (UE's) capability to provide hybrid automatic repeat request (HARQ) for low latency transmissions. The base station may select a HARQ timing mode based on the capability of the UE, and the base station may indicate the selected HARQ timing mode to the UE. The base station may transmit one or more low latency transmissions to UE using TTIs of a reduced duration relative to other TTIs supported by a system. The UE may respond with HARQ feedback based on the HARQ timing mode. In some cases, the HARQ timing mode may have different response times, which may be based on the location of the data transmission relative to other transmissions.

A method of wireless communication in a system that supports transmission time intervals (TTIs) of a first duration and a second duration that is less than the first duration is described. The method may include determining a hybrid automatic repeat request (HARQ) timing mode based at least in part on one or more capabilities of a UE to provide HARQ feedback in response to communications using transmission time intervals (TTIs) of the second duration and communicating using the HARQ timing mode.

An apparatus for wireless communication in a system that supports transmission time intervals (TTIs) of a first duration and a second duration that is less than the first duration is described. The apparatus may include means for determining a HARQ timing mode based at least in part on one or more capabilities of a UE to provide HARQ feedback in response to communications using TTIs of the second duration and means for communicating using the HARQ timing mode.

A further apparatus for wireless communication in a system that supports transmission time intervals (TTIs) of a first duration and a second duration that is less than the first duration is described. The apparatus may include a processor, memory in electronic communication with the processor, and instructions stored in the memory. The instructions may be operable to cause the processor to determine a HARQ timing mode based at least in part on one or more capabilities of a UE to provide HARQ feedback in response to communications using TTIs of the second duration and communicate using the HARQ timing mode.

A non-transitory computer-readable medium storing code for wireless communication in a system that supports transmission time intervals (TTIs) of a first duration and a second duration that is less than the first duration is described. The non-transitory computer-readable medium may include instructions to cause a processor to determine a HARQ timing mode based on one or more capabilities of a UE to provide HARQ feedback in response to communications using TTIs of the second duration and communicate using the HARQ timing mode.

A non-transitory computer readable medium for wireless communication is described. The non-transitory computer-readable medium may include instructions to cause a processor to determine a HARQ timing mode based on one or more capabilities of a UE to provide HARQ feedback in response to communications using TTIs of the second duration and communicate using the HARQ timing mode.

Some examples of the methods, apparatus and computer readable media described herein include features of, means for, or instructions for receiving a first transport block (TB) during a first TTI and a second TB during a second TTI, where the first TTI and the second TTI each have the second duration, and identifying a feedback time period based at least in part on the HARQ timing mode, where the HARQ timing mode may include a first HARQ response time and a second HARQ response time that is less than the first HARQ response time, and transmitting one or more HARQ feedback messages associated with the first or the second TB during the feedback time period, where the one or more HARQ feedback messages are received during a TTI of the first duration.

In some examples, communicating includes receiving a first transport block (TB) during a first TTI and a second TB during a second TTI, where the first TTI and the second TTI each have the second duration, identifying a feedback time period based at least in part on the HARQ timing mode, where the HARQ timing mode comprises a first HARQ response time and a second HARQ response time that is equal to the first HARQ response time, and transmitting one or more HARQ feedback messages associated with the first or the second TB during the feedback time period, where the one or more HARQ feedback messages are received during a TTI of the first duration. In some examples, the first TTI is within a latter part of a first time period having the first duration and the second TTI is within an initial part of a second time period having the first duration. Additionally or alternatively, the one or more HARQ feedback messages may include a first HARQ feedback message and a second HARQ feedback message distinct from the first HARQ feedback message.

In some examples, a latter portion of the first HARQ feedback message and an initial portion of the second HARQ feedback message are multiplexed using at least one of a physical uplink control channel (PUCCH) format capable of carrying more than two bits, a division of bits between the latter portion of the first HARQ feedback message and the initial portion of the second HARQ feedback message, joint coding of one or more bits of the first HARQ feedback message and the second HARQ feedback message, or a combination of bits based at least in part on an orthogonal cover code (OCC) and at least one parity bit, or any combination thereof.

Some examples of the methods, apparatus and computer readable media described herein include features of, means for, or instructions for transmitting an indication of the one or more capabilities of the UE to a base station. Some examples of the methods, apparatus and computer readable media described herein include features of, means for, or instructions for receiving an indication of a set of HARQ timing modes from a base station, and transmitting a HARQ timing mode request in response to the indication, wherein the HARQ timing mode is selected from the set of HARQ timing modes based at least in part on the HARQ timing mode request.

Some examples of the methods, apparatus and computer readable media described herein include features of, means for, or instructions for transmitting a first transport block (TB) during a first TTI and a second TB during a second TTI, where the first TTI and the second TTI each have the second duration, identifying a feedback time period based at least in part on the HARQ timing mode, where the HARQ timing mode comprises a first HARQ response time and a second HARQ response time that is less than the first HARQ response time, and receiving one or more HARQ feedback messages associated with the first or the second TB during the feedback time period, where the one or more HARQ feedback messages are received during a TTI of the first duration.

Some examples of the methods, apparatus and computer readable media described herein include features of, means for, or instructions for transmitting a first transport block (TB) during a first TTI and a second TB during a second TTI, where the first TTI and the second TTI each have the second duration, identifying a feedback time period based at least in part on the HARQ timing mode, wherein the HARQ timing mode comprises a first HARQ response time and a second HARQ response time that is equal to the first HARQ response time, and receiving one or more HARQ feedback messages associated with the first or the second TB during the feedback time period, where the one or more HARQ feedback messages are received during a TTI of the first duration.

Some examples of the methods, apparatus and computer readable media described herein include features of, means for, or instructions for identifying an uplink (UL) control configuration based at least in part on the HARQ timing mode, and transmitting an indication of the UL control configuration to the UE.

Some examples of the methods, apparatus and computer readable media described herein include features of, means for, or instructions for identifying a first physical uplink control channel (PUCCH) resource offset for UL transmissions that use TTIs of the first duration and a second PUCCH resource offset for UL transmissions that use TTIs of the second duration. In some examples, the second PUCCH resource offset is identified based at least in part on the first PUCCH resource offset and a delta value. In some examples, the first PUCCH resource offset or the second PUCCH resource offset is identified based at least in part on a PUCCH format. The one or more resource sets for UL transmissions may be associated with each PUCCH format of a set of PUCCH formats, and where the one or more resource sets may each associated with a different base station or layer three configuration.

Some examples of the methods, apparatus and computer readable media described herein include features of, means for, or instructions for identifying a first scheduled downlink (DL) transmission indicator associated with TTIs of the first duration and a second scheduled DL transmission indicator associated with TTIs of the second duration. In some examples, the first duration is a duration of one subframe and the second duration is a duration of one slot of a subframe.

DETAILED DESCRIPTION

Figure 1:
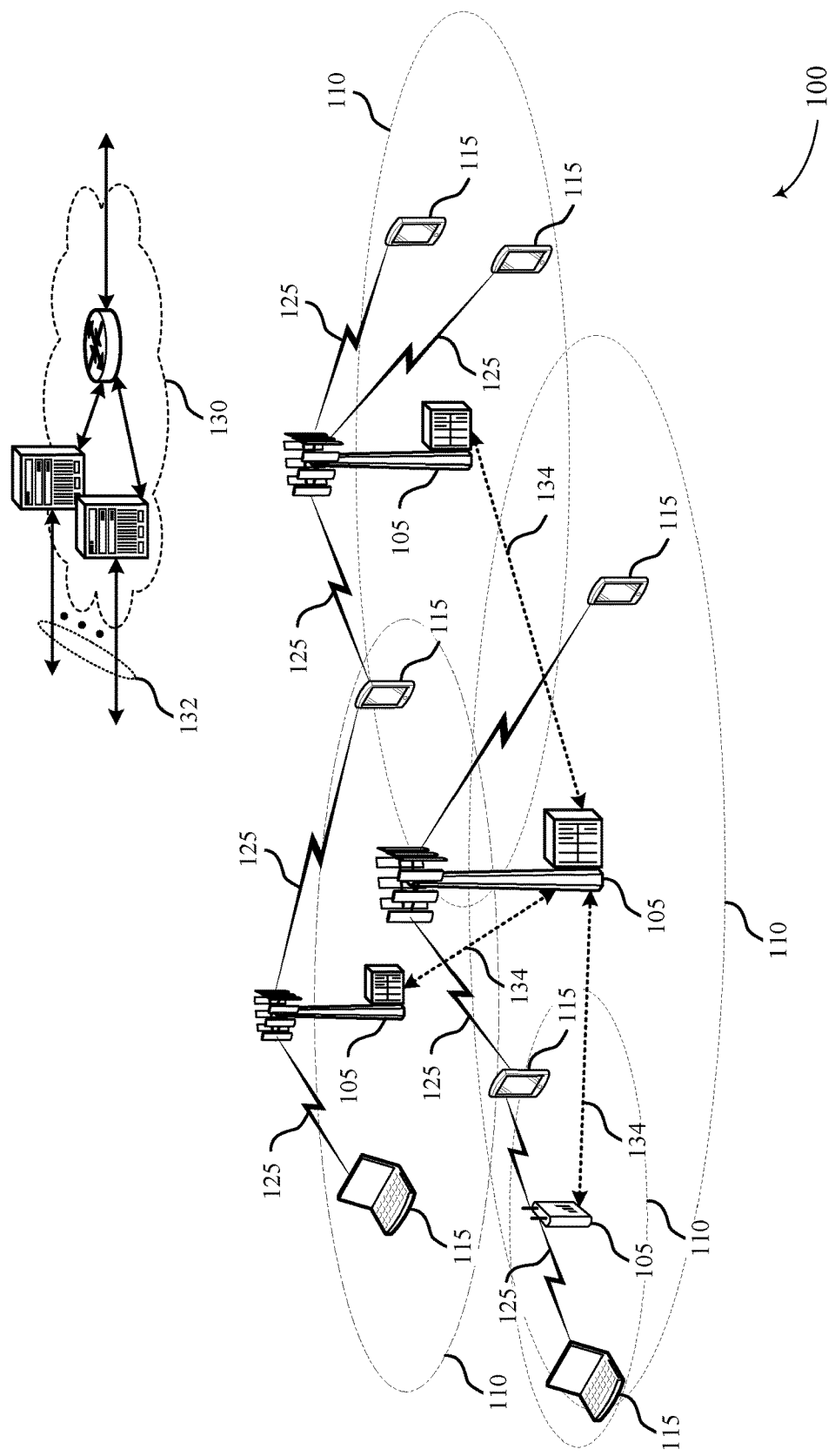
FIG. 1 illustrates an example of a wireless communications system that supports hybrid automatic repeat request (HARQ) timing for reduced transmission time intervals (TTIs) in accordance with aspects of the present disclosure.

Some wireless systems may support multiple transmission time interval (TTI) durations and may use different TTI durations for uplink (UL) and downlink (DL) transmissions. For example, a base station may transmit DL data transmissions using a reduced TTI (e.g., a low latency TTI such as a slot-based TTI with a duration of 0.5 ms) and a user equipment (UE) may respond with hybrid automatic repeat request (HARQ) feedback or other UL control information using a control message in a TTI of a different (e.g., longer) duration. For instance, a UE may provide HARQ feedback using a legacy or non-low latency UL transmission (e.g., a TTI with a duration of a Long Term Evolution (LTE) subframe (i.e., 1 ms)).

Using low latency DL transmissions (e.g., TTIs with a duration of 0.5 ms) may enable a reduced HARQ retransmission time relative to other configurations, but the latency benefit and efficiency of a HARQ response may depend on UE capabilities. Thus, a base station may identify a UE capability and select a HARQ timing mode accordingly. The HARQ timing mode may include a reduced response time between a DL transmission and the associated HARQ feedback, relative to other HARQ timing modes. In some cases, the response time may be different depending on the location of the DL transmission. For example, if a slot-duration TTI (or "slot TTI") is used for the DL transmission, each transport block (TB) of the DL transmission may be sent using either the first slot or the second slot in a subframe. The HARQ response time for TBs sent in one slot may be different than the response time for TBs sent in the other slot.

By way of example, transmission of low latency physical downlink shared channel (PDSCH) (e.g., a PDSCH transmission mapped to a slot-duration TTI) may allow for a HARQ timing to be shortened to a 2-slot gap or a 3-slot gap, relative to a PDSCH transmission that occupies a subframe. This may allow for a HARQ retransmission round trip time (RTT) of 4 ms, which represents a reduced latency relative legacy LTE operation (e.g., systems operating according to earlier releases of LTE HARQ may have an 8 ms RTT, which may be used for non-low latency transmission). In some examples, HARQ timing may be shortened to a 3-slot gap or a 4-slot gap, which may allow for a HARQ RTT of 5 ms. In another example, and as described in further detail below, the response time may be the same regardless of the TTI used for DL transmission, such that the UL control transmissions are offset in time (i.e., two overlapping subframe length UL control transmissions). In another example, HARQ timing for a DL-slot may align with 1 ms-duration UL control message (e.g., ACK/NACK) transmission timing, but the HARQ RTT may be 6 ms, a reduction relative to legacy operation.

Aspects of the disclosure introduced above are described below in the context of a wireless communication system. Additional examples of the disclosure are described with reference to configurations of uplink and downlink channels for low latency HARQ feedback timing. Aspects of the disclosure are further illustrated by and described with reference to apparatus diagrams, system diagrams, and flowcharts that relate to HARQ timing for reduced TTIs.

As used herein, the terms "low latency" and "reduced latency" may refer to timing between transmissions (e.g., RTT) that is less than a similar operation according to a legacy system or legacy version of a standard. Also, as used herein, "legacy" may refer to an earlier communication technology or release of LTE, which may have timing and operation known to those skilled in the art, but which does not include the reduced latency features described herein. In some examples, the term "non-low latency" may be used to describe legacy operation in a system that supports both legacy and low or reduced latency operation—e.g., in a system that supports communications using TTIs of different durations.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. In some examples, wireless communications system 100 may support various HARQ timing modes, including modes that provide for reduced RTT relative to legacy HARQ procedures.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115 or may operate under the control of a base station controller (not shown). In some examples, base stations 105 may be macro cells, small cells, hot spots, or the like. Base stations 105 may also be referred to as eNodeBs (eNBs) 105.

Time intervals in LTE may be expressed in multiples of a basic time unit (e.g., the sampling period, $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix (CP) prepended to each symbol). Excluding the CP, each symbol contains 2048 sample periods.

In some cases, the subframe may be the smallest scheduling unit, also known as a TTI. In other cases, a TTI may be shorter than a subframe or may be dynamically selected (e.g., in short TTI bursts or in selected component carriers (CCs) using short TTIs). System 100 may support communications according to TTIs of different durations (e.g., 1 ms and 0.5 ms). In some cases, the TTI duration used for UL transmissions may be different from that used for DL transmissions. For example, a one slot (0.5 ms) TTI may be used for DL transmissions and one subframe (1 ms) TTI may be used for UL transmissions. A 1 ms subframe may be referred to as an LTE subframe, LTE TTI, or legacy TTI.

Hybrid automatic repeat request (HARQ) may be a method of ensuring that data is received correctly over a wireless communication link 125. HARQ may include a combination of error detection (e.g., using a CRC), forward error correction (FEC), and retransmission (e.g., automatic repeat request (ARQ)). HARQ may improve throughput at the medium access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be useful in poor conditions. In other cases, redundancy bits are not added to each transmission, but are retransmitted after the transmitter of the original message receives a negative acknowledgement (NACK) indicating a failed attempt to decode the information. The chain of transmission, response and retransmission may be referred to as a HARQ process. In some cases, a limited number of HARQ processes may be used for a given communication link 125. In some cases, HARQ timing may be different for low latency and non-low latency communications. In some cases, when using low latency HARQ, the number of HARQ processes may be increased (e.g., from a limit of 8 to 10 or more).

In some examples, wireless communications system 100 may utilize enhanced component carriers (eCCs). An eCC may be characterized by one or more features including: wider bandwidth, shorter symbol duration, shorter TTIs (e.g., 0.5 ms TTIs), or a modified control channel configuration. In some cases, an eCC may be associated with a carrier aggregation (CA) configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, one or several CCs, such as an eCC, in system 100 may utilize a different symbol duration than other CCs, which may include use of a reduced symbol duration as compared with symbol durations of the other CCs. A shorter symbol duration may be associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A base station 105 may identify a UE capability to provide HARQ for low latency transmissions (e.g., TTIs of a reduced duration relative to other TTIs supported by system 100). The base station may select a HARQ timing mode based on the capability and indicate the selected HARQ timing mode to the UE 115. The base station may then transmit one or more low latency data transmissions to UE 115, and the UE may respond with HARQ feedback based on the HARQ timing mode. In some cases, the HARQ timing mode may be based on different response times based on the location of the data transmission. In other cases, the response times may be the same.

Figure 2:
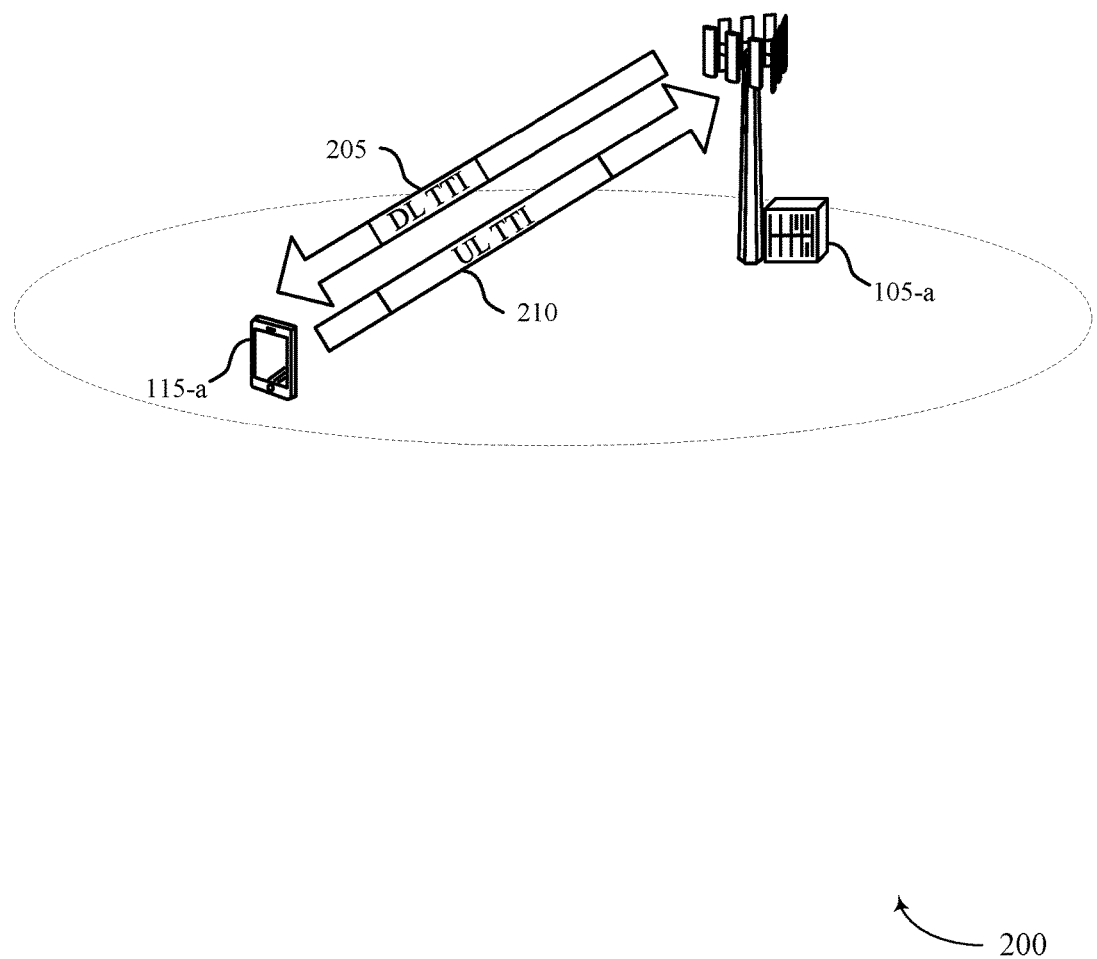
FIG. 2 illustrates an example of a wireless communications system that supports HARQ timing for reduced TTIs in accordance with aspects of the present disclosure.

FIG. 2 illustrates an example of a wireless communications system 200 for HARQ timing for reduced TTIs. Wireless communications system 200 may include base station 105-a and UE 115-a, which may be examples of the corresponding devices described with reference to FIG. 1. In some examples, wireless communications system 200 may support various HARQ timing modes, including modes that provide for reduce RTT relative to legacy HARQ procedures.

In some systems, DL and UL transmission may have different TTI durations (e.g., a 0.5 ms duration for DL and a 1 ms duration for UL). For example, a physical uplink control channel (PUCCH) or a physical uplink shared channel (PUSCH), or both, may be based on the longer UL TTI 205 and may be used together with DL transmissions using the shorter DL TTI 210. In some cases, a single control channel (e.g., a physical downlink control channel (PDCCH)) may schedule multiple DL transmissions with the reduced TTI duration (e.g., two slot-TTI transmissions during a subframe may be scheduled together). Alternatively, each reduced TTI transmission may be scheduled by a different control channel.

A shorter scheduled downlink TTI may enable reduced UL HARQ timing and, subsequently, the round-trip time (RTT) for the retransmission of transport blocks (TBs). Additionally, with a shortened TTI duration, TBs scheduled in different TTIs may have different UL HARQ timing to facilitate common UL HARQ configurations for DL transmissions with different TTIs.

In some examples, a HARQ timing mode may be selected to accommodate two different response DL transmissions occurring at different times. For example, transmission of low latency PDSCH, such as a PDSCH using a low latency TTI, may allow for a HARQ timing to be shortened to a 2-slot gap or a 3-slot gap, which may allow for a HARQ retransmission round trip time (RTT) of 4 ms. In another example, HARQ timing may be shortened to a 3-slot gap or a 4-slot gap, which may allow for a HARQ RTT of 0.5 ms. In another example, the response time may be the same regardless of the transmission time, such that the UL control transmissions are offset in time (i.e., two overlapping subframe length UL control transmissions). In yet another example, HARQ timing for a DL-slot may align with 1 ms ACK/NACK transmission timing, but the low latency HARQ RTT may be reduced to 6 ms. These examples illustrate configurations based on slot-length TTIs and 1 ms subframe length TTIs. But other TTIs may also be employed to provide for low latency benefits described herein.

As described above, using a combination of 2-slot and 3-slot timing for HARQ responses may result in 4 ms retransmission RTT. For example, a TB transmitted in a first slot of a subframe (e.g., slot 0) may have 3-slot HARQ timing. A second slot (e.g., slot 1) may have a two-slot HARQ timing. In this example, PUCCH resources in each subframe for 1 ms TTI UL transmissions may be determined by a control channel four subframes prior, while PUCCH resources for slot length TTI may be determined by a control channel two subframes prior.

In another example, using a combination of 3-slot and 4-slot timing may result in a HARQ RTT of 5 ms. In some examples using this configuration, DL timing may not align with a subframe boundary (although UL may be aligned).

That is, a first TB may be transmitted in the latter part of one subframe, and a second TB may be transmitted in the first part of the next subframe. In such cases, a PUCCH in subframe n may carry HARQ for a second slot (e.g., slot 1) in subframe n−3, and for the first slot (e.g., slot 0) in subframe n−2. That is, a first slot (e.g., slot 1 of the first DL subframe) may have a 4-slot HARQ timing. A second slot (e.g., slot 0 of the second DL subframe) may have a 3-slot HARQ timing.

In some examples, DL TBs transmitted in different slots may have the same HARQ response timing, which may result in staggered PUCCH responses. For example, a 3-slot HARQ timing with staggered PUCCH may result in a 4 ms HARQ RTT. In some cases, each slot length TTI may be associated with a different 1 ms TTI PUCCH. If back-to-back slot-TTI transmissions occur, the PUCCH for the two consecutive slot-TTI transmissions may result in parallel PUCCH transmissions (at least during one overlapping slot length period) or modified PUCCH transmissions (e.g., transmissions that are multiplexed over an overlapping slot length period). As an example, for a slot 0 PDSCH in subframe n, PUCCH may be transmitted in subframe n+2; for the low latency PDSCH transmitted in the second slot (i.e., slot 1) in the same subframe n, the PUCCH may be transmitted in slot 1 of subframe n+2 and slot 0 in subframe n+3.

In another example, using a combination of 7-slot and 8-slot response timing may result in a retransmission RTT of 6 ms. In such cases, PUCCH for slot based DL transmission may be aligned with PUCCH transmissions of 1 ms based DL transmissions occurring at the same time. However, the retransmission time for the low latency DL transmissions may be reduced relative to legacy operation (e.g., from 8 ms to 6 ms) by reducing the time period between the PUCCH and the subsequent retransmission.

Low latency HARQ scheduling techniques, including those described herein may reduce the possibility of PUCCH resource collision. That is, collisions may result from using different HARQ response timing for low latency and non-low latency DL transmissions together. For example, the collision possibility may be from PUCCH transmission in subframe n, which corresponds to DL transmissions in subframe n−$k_1$ for 1 ms TTI, and DL transmissions in subframe n−$k_2$ for slot length TTI. E.g., $k_1$=4, $k_2$=2. Since generally, $k_1$>$k_2$, it may be possible for base station to avoid or minimize PUCCH resource collision by scheduling slot length TTIs appropriately. For example, the starting PUCCH resource offset may be configured separately for 1 ms and 1-slot. The base station 105-a may use two different offsets for the two TTIs, such that two different PUCCH resource pools can be created.

Alternatively, for the slot length TTI, another offset may be introduced on top of the offset configured for 1 ms. That is, if a first offset, $\Delta_1$, is for 1 ms, then a second offset, $\Delta_1+\Delta_2$, may be used for 1-slot. The resource offset may depend on a PUCCH format—e.g., one resource offset separately configured for each PUCCH format. For a given PUCCH format, two or more resource sets may also be used. The usage of one of the two or more resource sets may be per base station scheduling or may be layer 3 configured (e.g., applicable to different subframe sets).

Thus, using 1 ms PUCCH for DL slot TTI (e.g., a DL transmission using a reduced duration TTI may reduce the HARQ timing and retransmission timing. In some cases, non-low latency HARQ (e.g., legacy HARQ) may be used for UEs 115 in unfavorable channel conditions, whereas low latency HARQ may be used in more favorable conditions.

However, when a UL control information is transmitting using a 1 ms TTI, a relatively larger timing advance may be used by the UE 115-a (e.g., due to relatively longer propagation delay), which may make it difficult to meet HARQ timeline if HARQ timing is shortened. That is, a HARQ timing for low latency communications may be selected to accommodate parallel or concurrent legacy HARQ operations within system 200.

Thus, the base station 105-a may support more than one HARQ timing option, and the UE 115-a may have the capability to support one or more of these timing options. For example, UE 115-a may support a HARQ timing mode that allows for low latency DL transmissions if, for instance, the UE 115-a has advanced processing power relative to other UEs 115. Another UE 115 may support a different timing mode if it is constrained in processing power (e.g., a machine type communication MTC device). In some cases, base station 105-a may indicate a HARQ timing option for UE 115-a, and UE 115-a may request a desired HARQ timing.

The usage of 1 ms-duration PUCCH (instead of low latency PUCCH) for HARQ feedback for DL transmission that uses a slot-duration TTI may also be tied with how the slot-duration TTI is scheduled. For example, if DL transmission in a slot-duration TTI is scheduled by a multi-TTI grant, a 1 ms-duration PUCCH may be used to provide HARQ feedback. Otherwise, a PUCCH with slot-duration TTI may be used. Although, in some cases, system 200 may operate more efficiently if 1 ms-duration PUCCH is used in many or most scenarios.

In some examples, a downlink assignment index (DAI) may also be used to indicate how many slot-duration TTI transmissions are scheduled for feedback in a PUCCH (e.g., slot 0 only, slot 1 only, or both slots within a carrier and across carriers). The DAI may count, cumulatively or in total, the number of scheduled DL transmissions. Additionally or alternatively, HARQ feedback may be sent using 1 ms-duration PUSCH with a similar timing as described herein for feedback provided in a 1 ms-duration PUCCH.

In some cases, low latency HARQ timing may include UL scheduling or HARQ timing for joint grants. If a joint grant operation is supported, the UL scheduling/HARQ timing may be based on timing of slot 0. For example, a control channel may be legacy PDCCH or shortened EPDCCH (i.e., EPDCCH only slot 0), where scheduling may be in both slot 0 and slot 1 . In other words, if a 1 ms-duration PUCCH is used for HARQ feedback, the control channel scheduling a PUSCH transmission in slot-duration TTI may be present in slot 0. In such cases, for slot 1 low latency PUSCH transmission, there may be 1 ms for base station to process and determine whether to perform re-transmissions or not (some relaxation is possible as in the DL, but not necessary).

In some examples, in an UL subframe, the scheduling determinations for a low latency PUSCH and 1 ms TTI PUSCH may be made in different subframes. For instance, for 1 ms-duration TTI, the scheduling determination may be made at 4 ms or earlier; and for slot-duration TTI, the scheduling decision may be made at 2 ms or earlier. Such scheduling may be may be a system operator or at base station 105-a to avoid resource fragmentation. Additionally or alternatively, a 2 ms scheduling may also be used for 1 ms-duration PUSCH.

In some cases, a HARQ timing mode or anticipated HARQ timing may be selected to accommodate dynamic and semi-persistent scheduling (SPS) traffic. If dynamic scheduling and SPS scheduling (of the same TTI) occurs in the same subframe, dynamic scheduling may take precedence. If different TTIs are supported, a dynamic scheduling of a first TTI may collide with a SPS scheduling of a second TTI in the same subframe. For example, there may be a 1 ms dynamic scheduling and a 1-slot SPS. In such cases, the slot-duration TTI SPS may be dropped (e.g., for receiving or transmitting), while the 1 ms may take precedence. In some examples, there may be a 1-slot dynamic scheduling and a 1 ms SPS for a DL transmission. In such cases, if the slot-duration TTI dynamic control channel (e.g., scheduling slot 0 data transmissions or for both slot 0 and slot 1 data transmissions) is received in slot 0, 1 ms based SPS may be dropped.

In some examples, if the slot-duration TTI dynamic control channel is received in slot 1, the UE may buffer potential SPS traffic for the entire subframe to determine whether it will monitor the SPS or not (e.g., the base station may still transmit SPS in slot 0, but the UE may not be required to decode it). Alternatively, 1 ms SPS may be given a higher priority than slot-duration TTI control channel in slot 1. That is, if a subframe has a 1 ms SPS for an UL transmission, the control channel scheduling slot 1 data transmission may not be transmitted in slot 1. In another example, there may be a 1-slot dynamic and a 1 ms SPS for an UL transmission or during an UL TTI. In such cases, the 1 ms SPS may be dropped. Generally, the SPS of a second TTI may be dropped due to a dynamic schedule of a first TTI in the same subframe.

Figure 3:
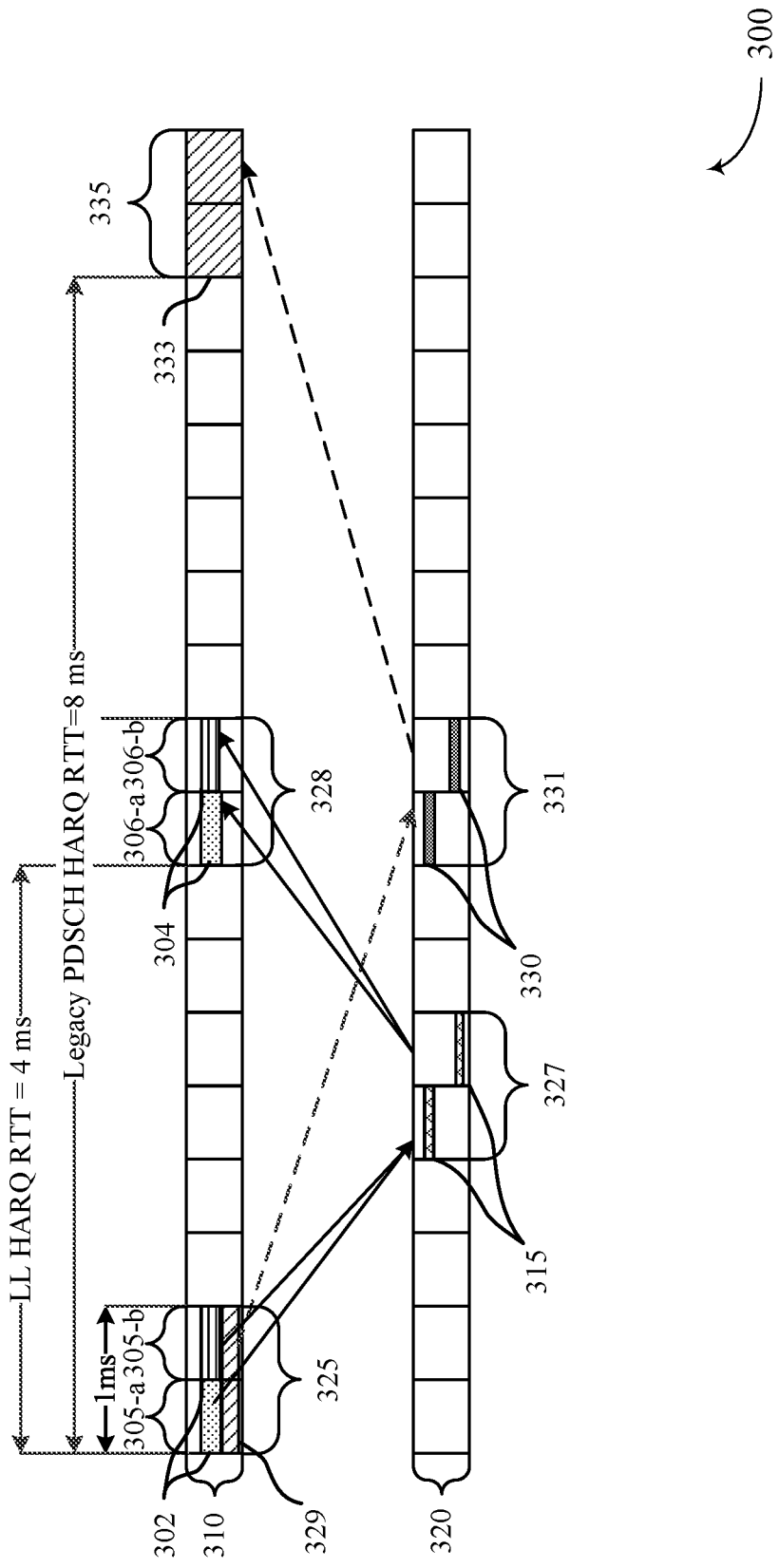
FIG. 3 illustrates an example of a carrier configuration that supports HARQ timing for reduced TTIs in accordance with aspects of the present disclosure.

Additional examples of operations and configurations of uplink and downlink channels for low latency HARQ feedback timing are described below. FIG. 3 illustrates an example of a channel configuration 300 for HARQ timing for reduced TTIs. In some cases, channel configuration 300 may represent aspects of techniques performed by a UE 115 or base station 105 as described with reference to FIGS. 1-2. Channel configuration 300 may represent an example based on 2-slot and 3-slot HARQ response timing as described with reference to FIGS. 1 and 2.

Low latency DL transmissions 302 may be transmitted on DL carrier 310. For example, low latency DL transmissions 302 may be transmitted during slot 0 305-*a* and slot 1 305-*b* of DL carrier 310 during subframe 325. UL control transmission 315 (i.e., a 1 ms TTI PUCCH transmission corresponding to the low latency DL transmissions 302) may be transmitted on UL carrier 320 in subframe 327. Low latency DL retransmissions 304 may then be transmitted on DL carrier 310 in slot 0 306-*a* and slot 1 306-*b* of subframe 328, which may be four subframes after subframe 325 (i.e., a 4 ms retransmission RTT).

Non-low latency DL transmission 329 may be transmitted on DL carrier 310 in two consecutive slots (e.g., slots 0 305-*a* and 1 305-*b*) during subframe 325. Non-low latency UL control transmission 330 may be transmitted on UL carrier 320 in subframe 331 and the non-low latency DL retransmission 333 may be sent in subframe 335, which may be eight subframes after subframe 325 (i.e., an 8 ms retransmission RTT).

Figure 4:
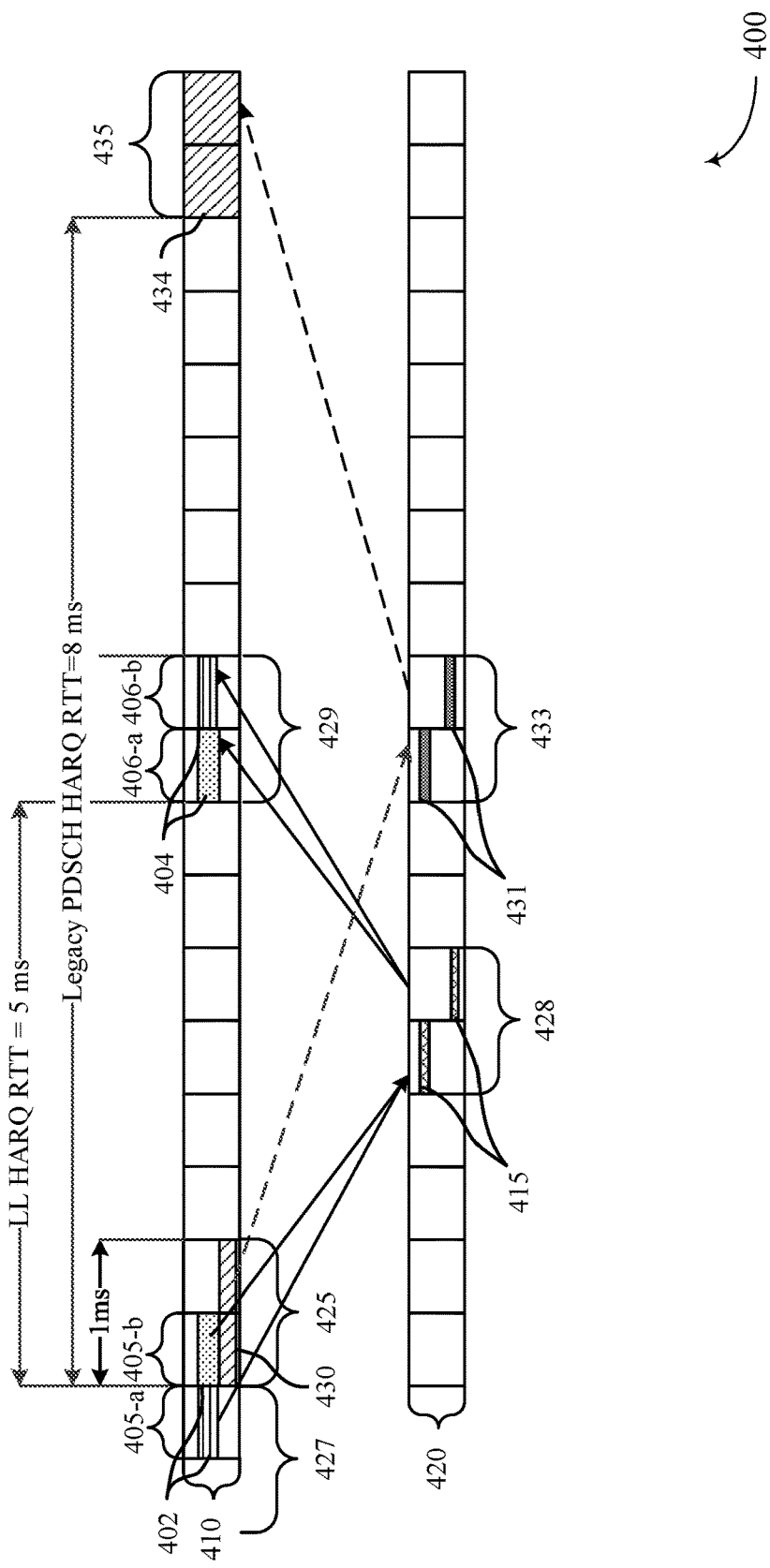
FIG. 4 illustrates an example of a carrier configuration that supports HARQ timing for reduced TTIs in accordance with aspects of the present disclosure.

FIG. 4 illustrates an example of a carrier configuration 400 for HARQ timing for reduced TTIs. In some cases, carrier configuration 400 may represent aspects of techniques performed by a UE 115 or base station 105 as described with reference to FIGS. 1-2. Configuration 400 may represent an example based on 3-slot and 4-slot HARQ response timing as described with reference to FIGS. 1 and 2.

Low latency DL transmissions 402 may be transmitted on DL carrier 410. For example, low latency DL transmission 402 may be transmitted during slot 0 405-*b* of DL carrier 410 during subframe 425 and slot 1 405-*a* of a preceding subframe 427. Low latency UL control transmission 415 (i.e., PUCCH transmission corresponding to the low latency DL transmissions 402) may be transmitted on UL carrier 420 in subframe 428. Low latency DL retransmissions 404 *b* may then be transmitted on DL carrier 410 during slot 0 406-*a* and slot 1 406-*b* of subframe 429, which may be five subframes after subframe 425 (i.e., a 5 ms RTT).

Non-low latency DL transmission 430 may be transmitted on DL carrier 410 in two consecutive slots of subframe 425. Non-low latency UL control transmission 431 may be transmitted on UL carrier 420 in subframe 433 and the non-low latency DL retransmission 434 may be sent in subframe 435, which may be eight subframes after subframe 425 (i.e., an 8 ms RRT).

Figure 5:
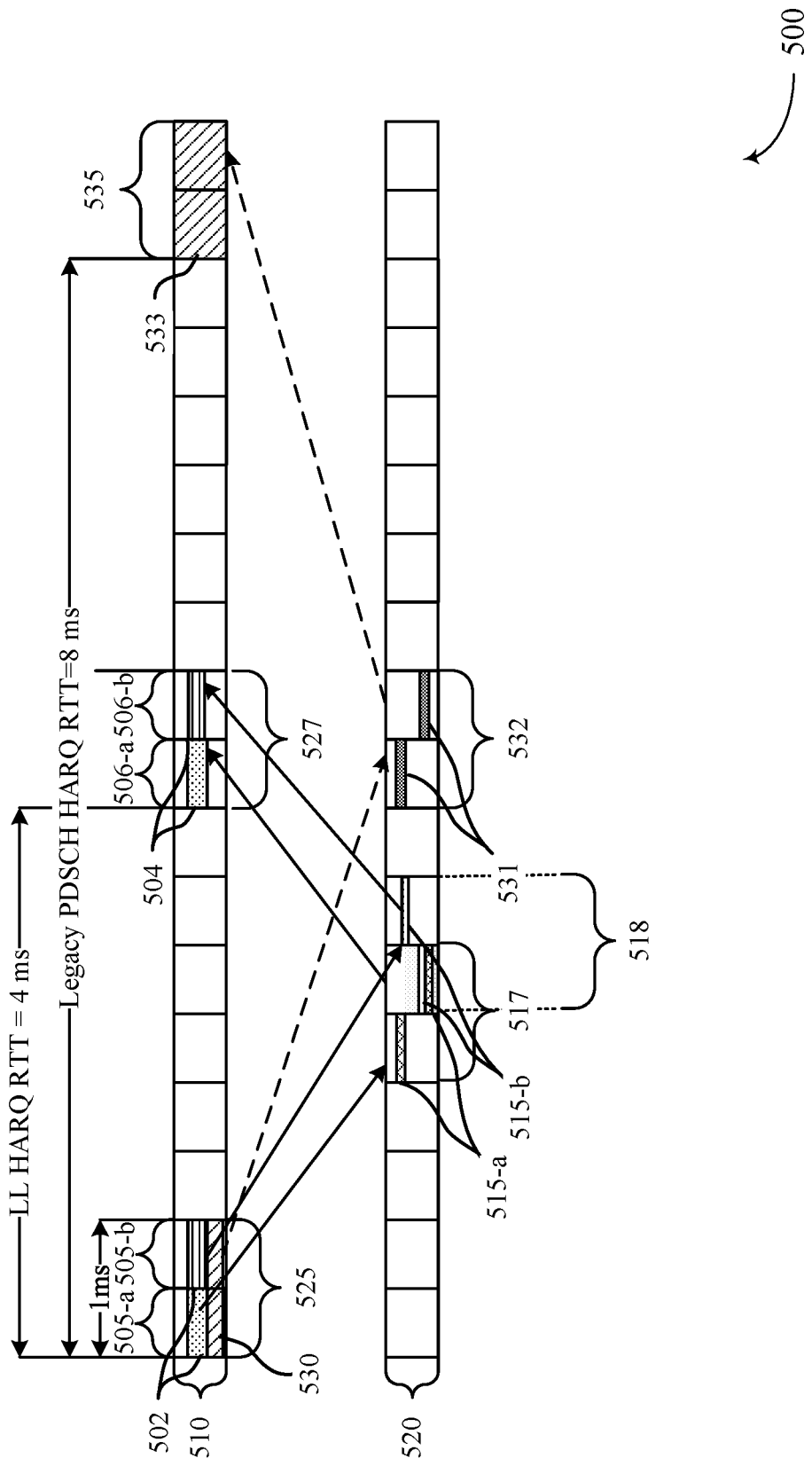
FIG. 5 illustrates an example of a carrier configuration that supports HARQ timing for reduced TTIs in accordance with aspects of the present disclosure.

FIG. 5 illustrates an example of a carrier configuration 500 for HARQ timing for reduced TTIs. In some cases, carrier configuration 500 may represent aspects of techniques performed by a UE 115 or base station 105 as described with reference to FIGS. 1-2. Configuration 500 may represent an example based on 3-slot and 4-slot HARQ response timing as described with reference to FIGS. 1 and 2.

Low latency DL transmissions 502 may be transmitted on DL carrier 510. For example, low latency DL transmission 502 may be transmitted during slot 0 505-*a* and slot 1 505-*b* of DL carrier 510 during 525. Low latency UL control transmission 515-*a* (i.e., PUCCH transmission corresponding to the low latency DL transmission 502 during slot 505-*a*) and low latency UL control transmission 515-*b* (i.e., PUCCH transmission corresponding to low latency DL transmission 502 during slot 1 505-*b*) may be transmitted on UL carrier 520 in time periods 517 and 518, each with duration of a subframe beginning three slots after slot 0 505-*a* and slot 505-*b*, respectively. Low latency DL retransmissions 504 may then be transmitted on DL carrier 510 during slot 0 506-*a* and slot 1 506-*b* of subframe 527, which may be four subframes after subframe 525 (i.e., a 4 ms RTT).

Non-low latency DL transmission 530 may be transmitted on DL carrier 510 in two consecutive slots during 525. Non-low latency UL control transmission 531 may be transmitting on UL carrier 520 in subframe 532 and the non-low latency DL retransmission 533 may be sent in subframe 535, which may be eight subframes after subframe 525 (i.e., an 8 ms RRT).

Figure 6:
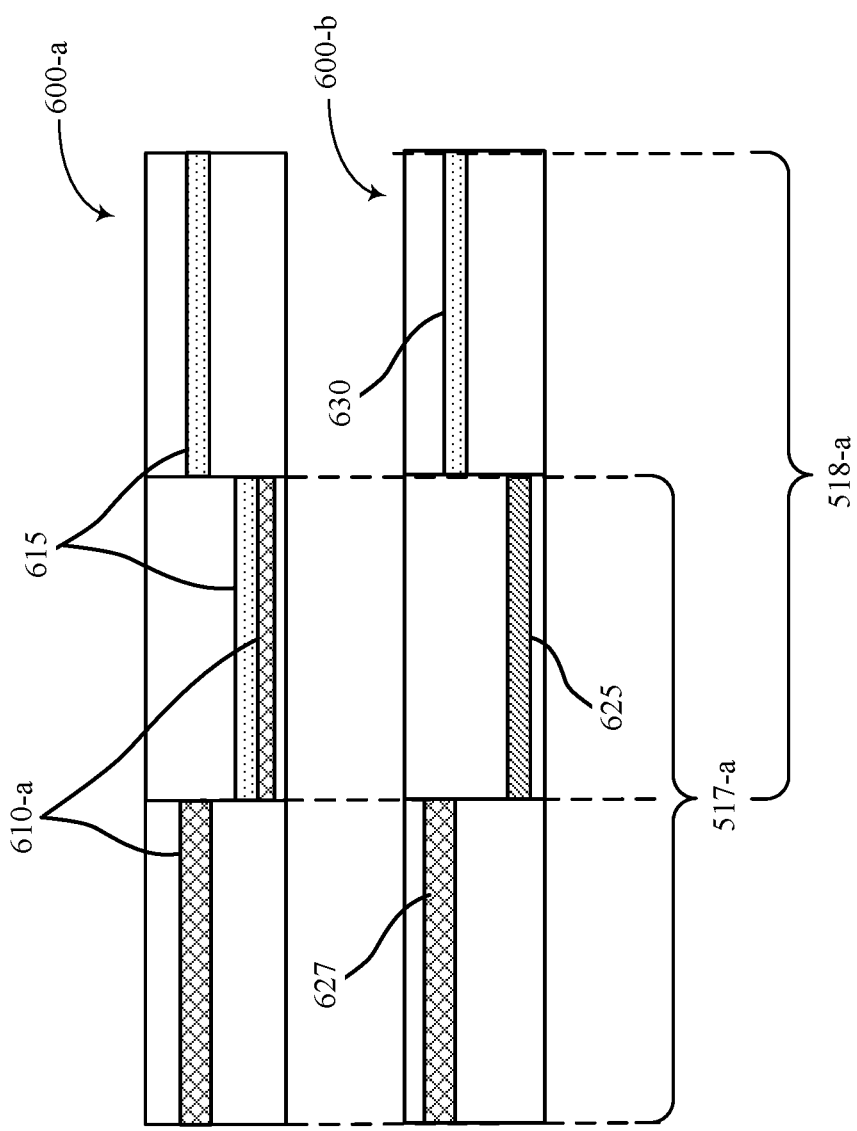
FIG. 6 illustrates an example of a slot configuration that supports HARQ timing for reduced TTIs in accordance with aspects of the present disclosure.

FIG. 6 illustrates an example of slot configurations 600 for HARQ timing for reduced TTIs. Slot configurations 600 may represent aspects of transmissions performed by a UE 115 as described with reference to FIG. 5, and more specifically to examples of feedback transmitted during time periods 517 and 518 of FIG. 5.

In configuration 600-*a* two separate PUCCH transmissions 610 and 615 with control information (e.g., ACK/NACK for separate different low latency DL) transmissions may occupy a common slot of time periods 517-*a* and 518-*a*. In some examples, the two PUCCH transmissions 610 and 615 may be mapped to the same RB, which may improve operating constraints (e.g., such mapping may serve to limit maximum power reduction (MPR) requirements for modulation).

In configuration 600-*b*, a modified PUCCH 625 may be used to carry HARQ responses for multiple low latency DL transmissions. For example, 2-bit HARQ feedback may be used for each slot-duration DL transmission for which feedback is being sent. By way of example, the three slots of time periods 517-*a* and 518-*a* may provide 2-bit, 4-bit, and 2-bit HARQ feedback, respectively. For example, PUCCH format 3 may be used, which may have 2-bit, 4-bit, and 2-bit payload respectively for the three slots. Alternatively, PUCCH format 1b with a modified format operation may be used and the second slot may carry 4-bits. For instance, there may be four data symbols in one slot, which may carry the same QPSK symbol (2-bit). The data symbols may include two pairs of symbols that each carry a separate QPSK symbol, thus making a 4-bit payload in one slot. So, for spreading length four, for UEs 115 capable of such reduced duration HARQ timing may use spreading codes [+1, +1, +1, +1] or [+1, +1, −1, −1], and legacy PUCCH may still be multiplexed in the same resource block (RB) if UEs 115 transmitting legacy PUCCH use spreading codes [+1, −1, +1, −1] or [+1, −1, −1, +1], for example.

Additionally or alternatively, configuration 600-b may support other aspects of HARQ timing for reduced TTIs. For example, if a UE 115 is configured to use a modified uplink format and does not detect a grant for the second slot of a DL transmission (e.g., miss-detection), the base station may not know whether the grant was received or not. So in some cases, configuration 600-b may allow the second pair (i.e. last two single carrier frequency division multiplexing (SC-FDM) symbols) of the second slot (i.e., the overlapping slot of time periods 517-a and 518-a) empty. Orthogonality may still be maintained in such cases.

Alternatively, the second slot of configuration 600-b may be arranged so that the first two symbols may carry the first two bits, $b_0$ and $b_1$, the second two symbols may carry $b_2$ and $b_3$ bits, but an XOR operation of the first and second bits respectively, i.e. $b_0$ XOR $b_2$ and $b_1$ XOR $b_3$ may be used to indicate whether a grant in the second slot was received. For example, when the base station does not schedule the second slot, the base station may determine that $b_2$=NAK and $b_3$=NAK, so $b_0$ and $b_1$ may be repeated. Performance loss may be minimal in this example, as compared with alternative ways of conveying similar information. When the base station schedules the second slot, bits may be decoded jointly and there may be some performance loss due to error propagation (i.e. error in one bit creates errors in two bits).

Configuration 600-b may also depend, for example, on an orthogonal cover code (OCC) employed. For instance, if the OCC is length three discrete Fourier transform (DFT), (e.g., OCC [1, 1, 1] for legacy PUCCH; other OCC codes may be [1, $e^{j2\pi/3}$, $e^{(j4\pi/3)}$] or [1, $e^{j4\pi/3}$, $e^{j2\pi/3}$]). Among the 3 symbols in a slot for PUCCH ($s_0$, $s_1$, $s_2$), $s_0$ may carry ACK/NAK for the first DL slot-TTI transmission, $s_2$ may carry ACK/NAK for the second DL slot-TTI transmission, and $s_2$ may be a "parity," such that $s_2 = -(s_0+s_1)$. In such cases, orthogonality with legacy operations may be maintained since $s_0+s_1+s_2=0$. If the three received symbols are $r_0$, $r_1$, and $r_2$, then the original symbols may be recovered as $s_0=-(2r_0-r_1-r_2)/3$, and $s_1=(2r_1-r_0-r_2)/3$. Accordingly, the HARQ timing described with reference to FIGS. 5 and 6 may provide for various options to efficiently transmit HARQ feedback for low latency transmissions while maintaining compatibility with legacy operation.

Figure 7:
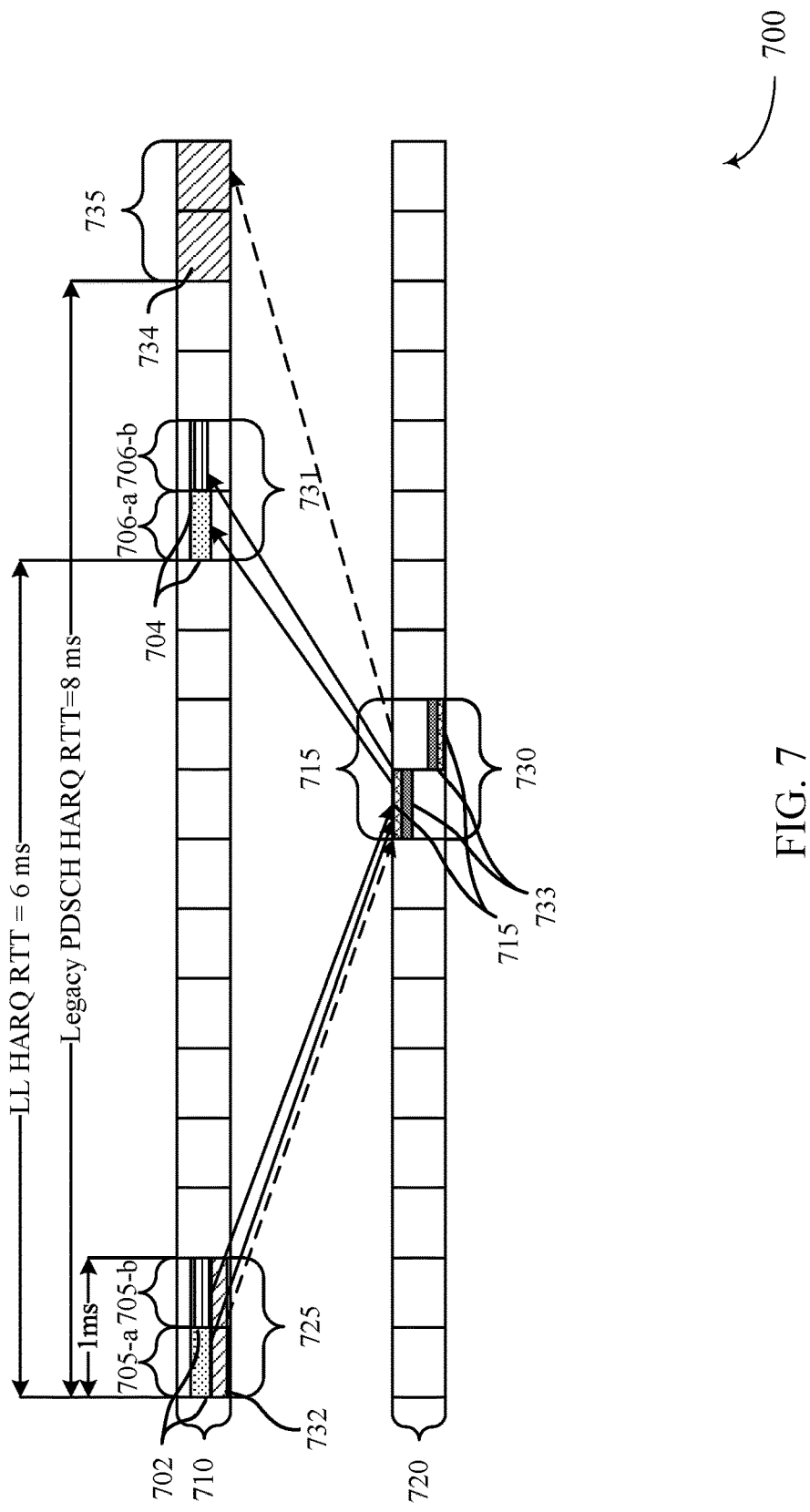
FIG. 7 illustrates an example of a carrier configuration that supports HARQ timing for reduced TTIs in accordance with aspects of the present disclosure.

FIG. 7 illustrates an example of a carrier configuration 700 for HARQ timing for reduced TTIs. In some cases, carrier configuration 700 may represent aspects of techniques performed by a UE 115 or base station 105 as described with reference to FIGS. 1-2. Configuration 700 may represent an example based on 6-slot HARQ response timing as described with reference to FIGS. 1-2.

Low latency DL transmissions 702 transmissions may be transmitted on DL carrier 710. For example, low latency DL transmission 702 may be scheduled during slot 0 705-a and slot 1 705-b of DL carrier 710 during subframe 725. Low latency UL control transmission 715 (i.e., PUCCH transmission corresponding to the low latency DL transmissions 702) may be transmitted on UL carrier 720 in subframe 730. Low latency DL retransmissions 704 may then be transmitted on DL carrier 710 during slot 0 706-a and slot 1 706-b of subframe 731, which may be six subframes after subframe 725 (i.e., a 6 ms RTT).

Non-low latency DL transmission 732 may be transmitted on DL carrier 710 in two consecutive slots during subframe 725). Non-low latency UL control transmission 733 may be transmitted on UL carrier 720 also in subframe 730, and the non-low latency DL retransmission 734 may be sent in subframe 735, which may be eight subframes after subframe 725 (i.e., an 8 ms RTT).

Figure 8:
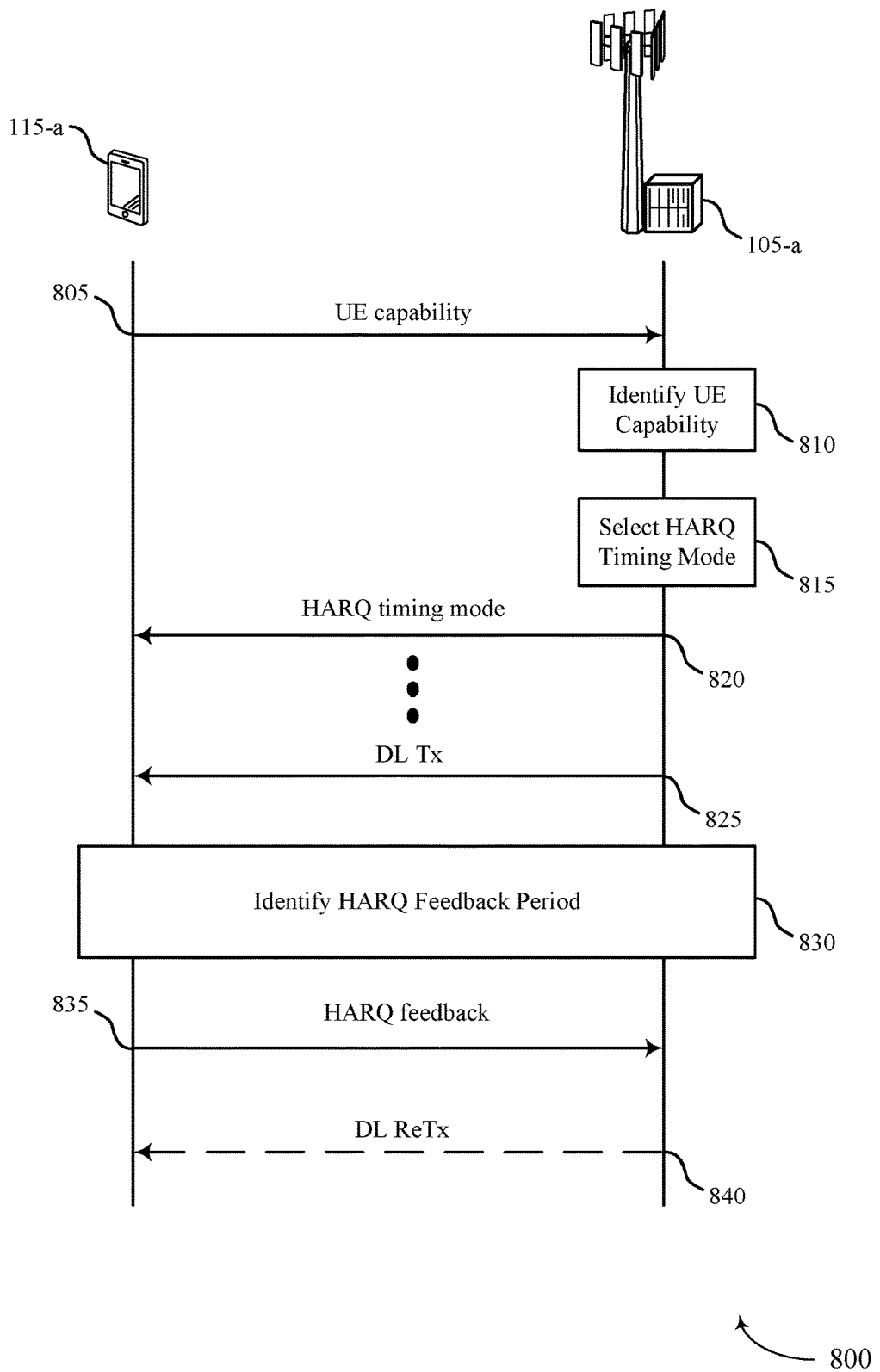
FIG. 8 illustrates an example of a process flow in a system that supports HARQ timing for reduced TTIs in accordance with aspects of the present disclosure.

FIG. 8 illustrates an example of a process flow 800 for HARQ timing for reduced TTIs in accordance with various aspects of the present disclosure. Process flow 800 may include base station 105-a and UE 115-a, which may be examples of the corresponding devices described with reference to FIG. 1-2.

At step 805, base station 105-a may receive an indication of UE 115-a HARQ feedback capability. At step 810, base station 105-a may identify a capability of UE 115-a to provide HARQ feedback associated with TTIs of a second duration. At step 815, base station 105-a may select a HARQ timing mode based at least in part on the capability of the UE 115-a. At step 820, base station 105-a may transmit an indication of the HARQ timing mode to the UE 115-a.

At step 825, base station 105-a may transmit a first transport block (TB) during a first transmission time interval (TTI) and second TB during a second TTI of a second duration. Additionally, the first TB may be associated with an uplink (UL) resource for HARQ feedback, which may be based at least in part on a downlink (DL) control channel transmitted during a time period four times the second duration prior to the transmission of the first TB.

At step 830, base station 105-a may identify a feedback time period based at least in part on the HARQ timing mode. Additionally, the HARQ timing mode may include a first HARQ response time of four times the second duration and a second HARQ response time of three times the second duration.

At step 835, base station 105-a may receive one or more HARQ feedback messages associated with the first and second TB, wherein the one or more HARQ feedback messages are received during a TTI of the first duration. Additionally, the one or more HARQ feedback messages may comprise a first HARQ feedback message and a second HARQ feedback message, where the first HARQ feedback message is associated with the first TB and the second HARQ feedback message is associated with the second TB. Additionally, the first and second HARQ feedback messages may be configured according to the first duration.

At step 840, base station 105-a may retransmit the first TB or the second TB based at least in part on a retransmission time of ten times the second duration.

Figure 9:
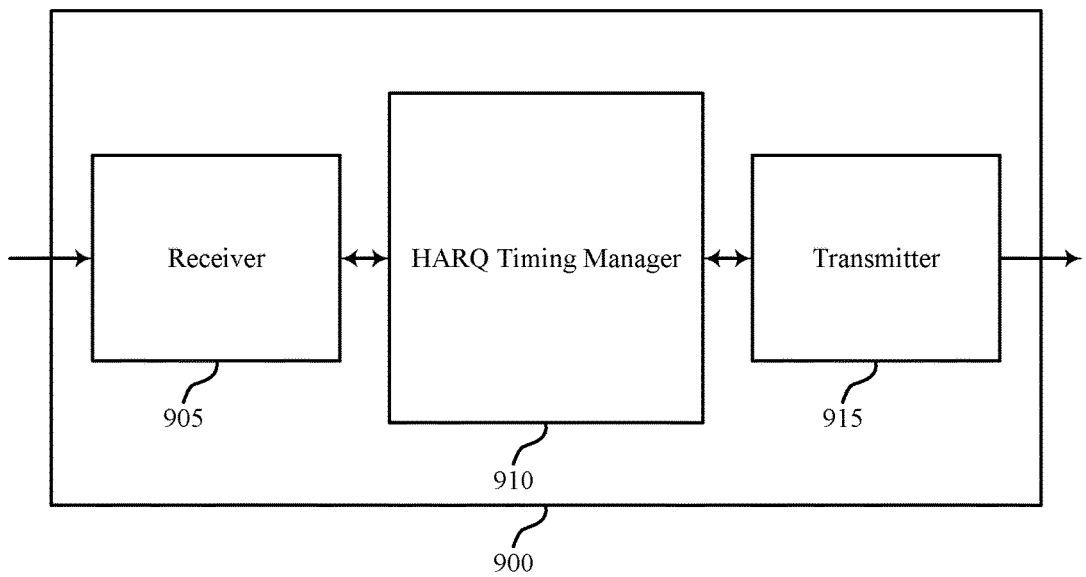
FIGS. 9 through 11 show block diagrams of a wireless device or devices that support HARQ timing for reduced TTIs in accordance with aspects of the present disclosure.

FIG. 9 shows a block diagram of a wireless device 900 that supports HARQ timing for reduced TTIs in accordance with various aspects of the present disclosure. Wireless device 900 may be an example of aspects of a UE 115 or base station 105 described with reference to FIGS. 1 and 2. Wireless device 900 may include receiver 905, HARQ timing manager 910 and transmitter 915. Wireless device 900 may also include a processor. Each of these components may be in communication with each other.

The receiver 905 may receive information such as packets, user data, or control information associated with various information channels (e.g., control channels, data channels, and information related to HARQ timing for reduced TTIs, etc.). Information may be passed on to other components of the device. The receiver 905 may be an example of aspects of the transceiver 1225 described with reference to FIG. 12.

The HARQ timing manager 910 may determine a HARQ timing mode based on one or more capabilities of a UE to provide HARQ feedback in response to communications using TTIs of the second duration, and communicate, in combination with receiver 905 or transmitter 915, or both, using the HARQ timing mode. The HARQ timing manager 910 may also be an example of aspects of the HARQ timing manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
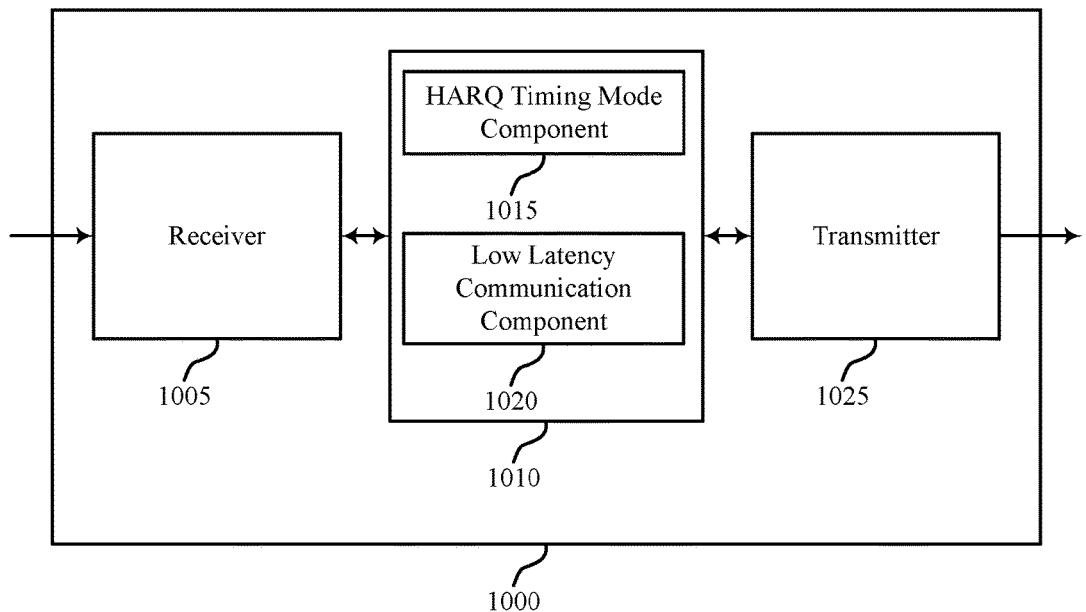

FIG. 10 shows a block diagram of a wireless device 1000 that supports HARQ timing for reduced TTIs in accordance with various aspects of the present disclosure. Wireless device 1000 may be an example of aspects of a wireless device 900 or a UE 115 or base station 105 described with reference to FIGS. 1, 2 and 9. Wireless device 1000 may include receiver 1005, HARQ timing manager 1010 and transmitter 1025. Wireless device 1000 may also include a processor. Each of these components may be in communication with one another.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The HARQ timing manager 1010 may be an example of aspects of HARQ timing manager 910 described with reference to FIG. 9. The HARQ timing manager 1010 may include HARQ timing mode component 1015 and low latency communication component 1020. The HARQ timing manager 1010 may be an example of aspects of the HARQ timing manager 1205 described with reference to FIG. 12.

The HARQ timing mode component 1015 may transmit an indication of the one or more capabilities of a UE to a base station, receive an indication of a set of HARQ timing modes from a base station, and determine a HARQ timing mode based on one or more capabilities of a UE to provide HARQ feedback in response to communications using TTIs of the second duration. The operations of HARQ timing mode component 1015 may be performed in combination with receiver 1005 or transmitter 1025 in various examples.

The low latency communication component 1020 may communicate, in combination with receiver 1005 or transmitter 1025, using the HARQ timing mode. In some cases, the communicating includes receiving a first TB during a first TTI and a second TB during a second TTI, where the first TTI and the second TTI each have the second duration. In some cases, the first TTI is within a latter part of a first time period having the first duration and the second TTI is within an initial part of a second time period having the first duration. In some cases, the communicating includes transmitting a first TB during a first TTI and a second TB during a second TTI, where the first TTI and the second TTI each have the second duration.

The transmitter 1025 may transmit signals received from other components of wireless device 1000. In some examples, the transmitter 1025 may be collocated with a receiver in a transceiver module. For example, the transmitter 1025 may be an example of aspects of the transceiver 1225 described with reference to FIG. 12. The transmitter 1025 may utilize a single antenna, or it may utilize a plurality of antennas.

Figure 11:
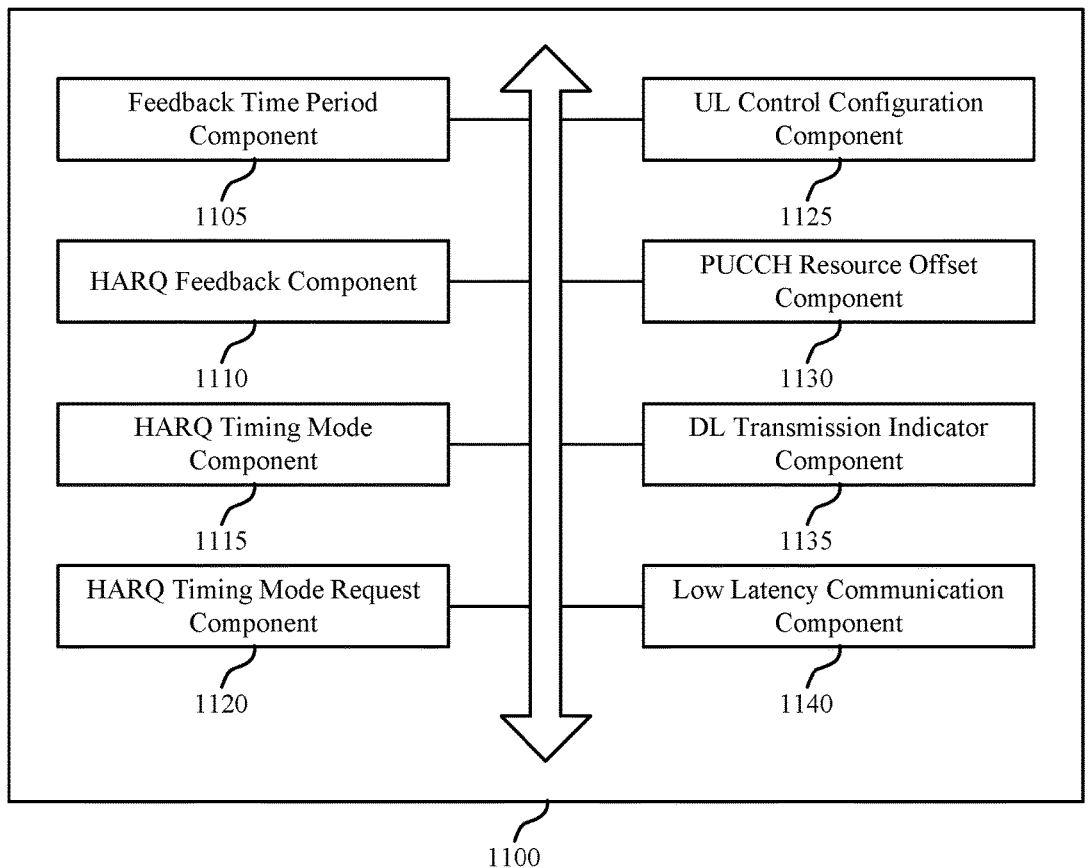

FIG. 11 shows a block diagram of a HARQ timing manager 1100 which may be an example of the corresponding component of wireless device 900 or wireless device 1000. That is, HARQ timing manager 1100 may be an example of aspects of HARQ timing manager 910 or HARQ timing manager 1010 described with reference to FIGS. 9 and 10. The HARQ timing manager 1100 may also be an example of aspects of the HARQ timing manager 1205 described with reference to FIG. 12.

The HARQ timing manager 1100 may include feedback time period component 1105, HARQ feedback component 1110, HARQ timing mode component 1115, HARQ timing mode request component 1120, UL control configuration component 1125, PUCCH resource offset component 1130, DL transmission indicator component 1135, and low latency communication component 1140. Each of these modules may communicate, directly or indirectly, with one another (e.g., via one or more buses).

The feedback time period component 1105 may identify a feedback time period based on the HARQ timing mode, where the HARQ timing mode includes a first HARQ response time and a second HARQ response time that is equal to the first HARQ response time, or where the HARQ timing mode includes a first HARQ response time and a second HARQ response time that is less than the first HARQ response time.

The HARQ feedback component 1110 may transmit or receive one or more HARQ feedback messages associated with the first or the second TB during the feedback time period, where the one or more HARQ feedback messages are received during a TTI of the first duration. The HARQ feedback component 1110 may perform operations in combination with a receiver 1005 or transmitter 1025 of FIG. 10. In some cases, the one or more HARQ feedback messages include a first HARQ feedback message and a second HARQ feedback message distinct from the first HARQ feedback message. In some cases, a latter portion of the first HARQ feedback message and an initial portion of the second HARQ feedback message are multiplexed using at least one of a PUCCH format capable of carrying more than two bits, a division of bits between the latter portion of the first HARQ feedback message and the initial portion of the second HARQ feedback message, joint coding of one or more bits of the first HARQ feedback message and the second HARQ feedback message, a combination of bits based on an orthogonal cover code (OCC) and at least one parity bit, or any combination thereof.

The HARQ timing mode component 1115 may transmit an indication of the one or more capabilities of a UE to a base station, receive an indication of a set of HARQ timing modes from a base station, and determine a HARQ timing mode based on one or more capabilities of a UE to provide HARQ feedback in response to communications using TTIs of the second duration. The operations of HARQ timing mode component 1115 may be performed in combination with receiver 1005 or transmitter 1025 of FIG. 10.

The HARQ timing mode request component 1120 may, in combination with transmitter 1025, transmit a HARQ timing mode request in response to the indication, where the HARQ timing mode is selected from the set of HARQ timing modes based on the HARQ timing mode request. The UL control configuration component 1125 may identify an UL control configuration based on the HARQ timing mode, and transmit an indication of the UL control configuration to a UE.

The PUCCH resource offset component 1130 may identify a first PUCCH resource offset for UL transmissions that use TTIs of the first duration and a second PUCCH resource offset for UL transmissions that use TTIs of the second duration. In some cases, the second PUCCH resource offset is identified based on the first PUCCH resource offset and a delta value. In some cases, the first PUCCH resource offset or the second PUCCH resource offset is identified based on a PUCCH format. In some cases, the one or more resource sets for UL transmissions are associated with each PUCCH format of a set of PUCCH formats, and where the one or more resource sets are each associated with a different base station or layer three configuration.

The DL transmission indicator component 1135 may identify a first scheduled DL transmission indicator associated with TTIs of the first duration and a second scheduled DL transmission indicator associated with TTIs of the second duration.

The low latency communication component 1140 may communicate using the HARQ timing mode. In some cases, the communicating includes transmitting or receiving a first TB during a first TTI and a second TB during a second TTI, where the first TTI and the second TTI each have the second duration. The operations of low latency communication component 1140 may be performed in combination with receiver 1005 or transmitter 1025 of FIG. 10.

Figure 12:
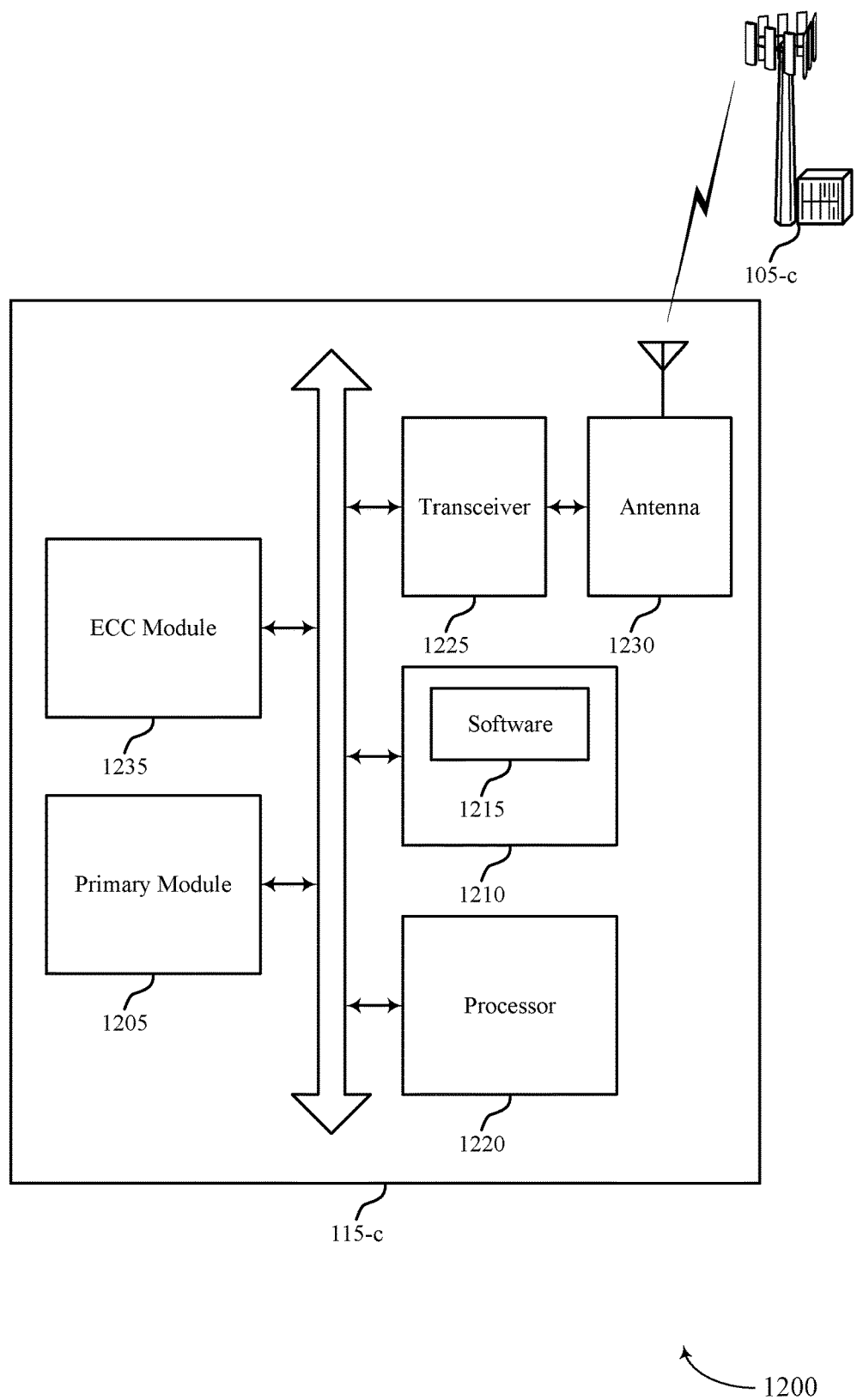
FIG. 12 illustrates a block diagram of a system including a UE that supports HARQ timing for reduced TTIs in accordance with aspects of the present disclosure.

FIG. 12 shows a diagram of a system 1200 including a device that supports HARQ timing for reduced TTIs in accordance with various aspects of the present disclosure. For example, system 1200 may include UE 115-*c*, which may be an example of a wireless device 900, a wireless device 1000, or a UE 115 as described with reference to FIGS. 1, 2, and 9 through 11.

UE 115-*c* may also include HARQ timing manager 1205, memory 1210, processor 1220, transceiver 1225, antenna 1230, and ECC module 1235. Each of these modules may communicate, directly or indirectly, with one another (e.g., via one or more buses). The HARQ timing manager 1205 may be an example of a primary module as described with reference to FIGS. 9 through 11.

The memory 1210 may include random access memory (RAM) and read only memory (ROM). The memory 1210 may store computer-readable, computer-executable software including instructions that, when executed, cause the processor to perform various functions described herein (e.g., HARQ timing for reduced TTIs, etc.). In some cases, the software 1215 may not be directly executable by the processor but may cause a computer (e.g., when compiled and executed) to perform functions described herein. The processor 1220 may include an intelligent hardware device, (e.g., a central processing unit (CPU), a microcontroller, an application specific integrated circuit (ASIC), etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 1230, which may be capable of concurrently transmitting or receiving multiple wireless transmissions.

ECC module 1235 may enable operations using enhanced component carriers (ECCs) such as communication using shared or unlicensed spectrum, using reduced TTIs or subframe durations, or using a large number of component carriers.

Figure 13:
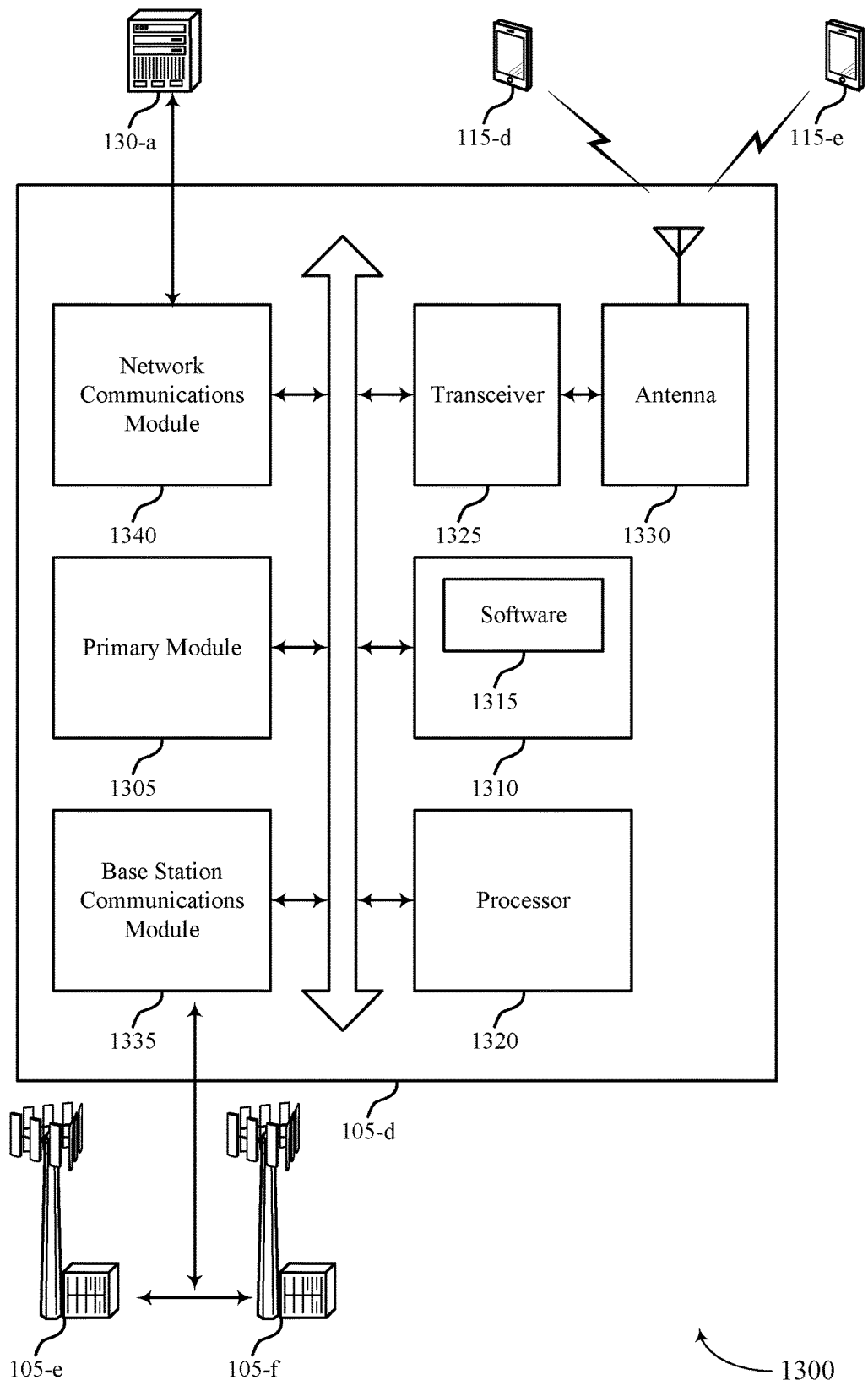
FIG. 13 illustrates a block diagram of a system including a base station that supports HARQ timing for reduced TTIs in accordance with aspects of the present disclosure.

FIG. 13 shows a diagram of a wireless system 1300 including a device configured that supports HARQ timing for reduced TTIs in accordance with various aspects of the present disclosure. For example, system 1300 may include base station 105-*d*, which may be an example of a wireless device 900, a wireless device 1000, or a base station 105 as described with reference to FIGS. 1, 2 and 9 through 11. Base station 105-*d* may also include components for bi-directional voice and data communications including components for transmitting communications and components for receiving communications. For example, base station 105-*d* may communicate bi-directionally with one or more UEs 115.

Base station 105-*d* may also include primary module 1305, memory 1310, processor 1320, transceiver 1325, antenna 1330, base station communications module 1335 and network communications module 1340. Each of these modules may communicate, directly or indirectly, with one another (e.g., via one or more buses). The primary module 1305 may be an example of a primary module as described with reference to FIGS. 9 through 11.

The memory 1310 may include RAM and ROM. The memory 1310 may store computer-readable, computer-executable software including instructions that, when executed, cause the processor to perform various functions described herein (e.g., HARQ timing for reduced TTIs, etc.). In some cases, the software 1315 may not be directly executable by the processor but may cause a computer (e.g., when compiled and executed) to perform functions described herein. The processor 1320 may include an intelligent hardware device, (e.g., a CPU, a microcontroller, an ASIC, etc.)

The transceiver 1325 may communicate bi-directionally, via one or more antennas, wired, or wireless links, with one or more networks, as described above. For example, the transceiver 1325 may communicate bi-directionally with a base station 105 or a UE 115. The transceiver 1325 may also include a modem to modulate the packets and provide the modulated packets to the antennas for transmission, and to demodulate packets received from the antennas. In some cases, the wireless device may include a single antenna 1330. However, in some cases the device may have more than one antenna 1230, which may be capable of concurrently transmitting or receiving multiple wireless transmissions.

The base station communications module 1335 may manage communications with other base station 105, and may include a controller or scheduler for controlling communications with UEs 115 in cooperation with other base stations 105. For example, the base station communications module 1335 may coordinate scheduling for transmissions to UEs 115 for various interference mitigation techniques such as beamforming or joint transmission. In some examples, base station communications module 1335 may provide an X2 interface within an LTE/LTE-A wireless communication network technology to provide communication between base stations 105.

The network communications module 1340 may manage communications with the core network (e.g., via one or more wired backhaul links). For example, the network communications module 1340 may manage the transfer of data communications for client devices, such as one or more UEs 115.

Figure 14:
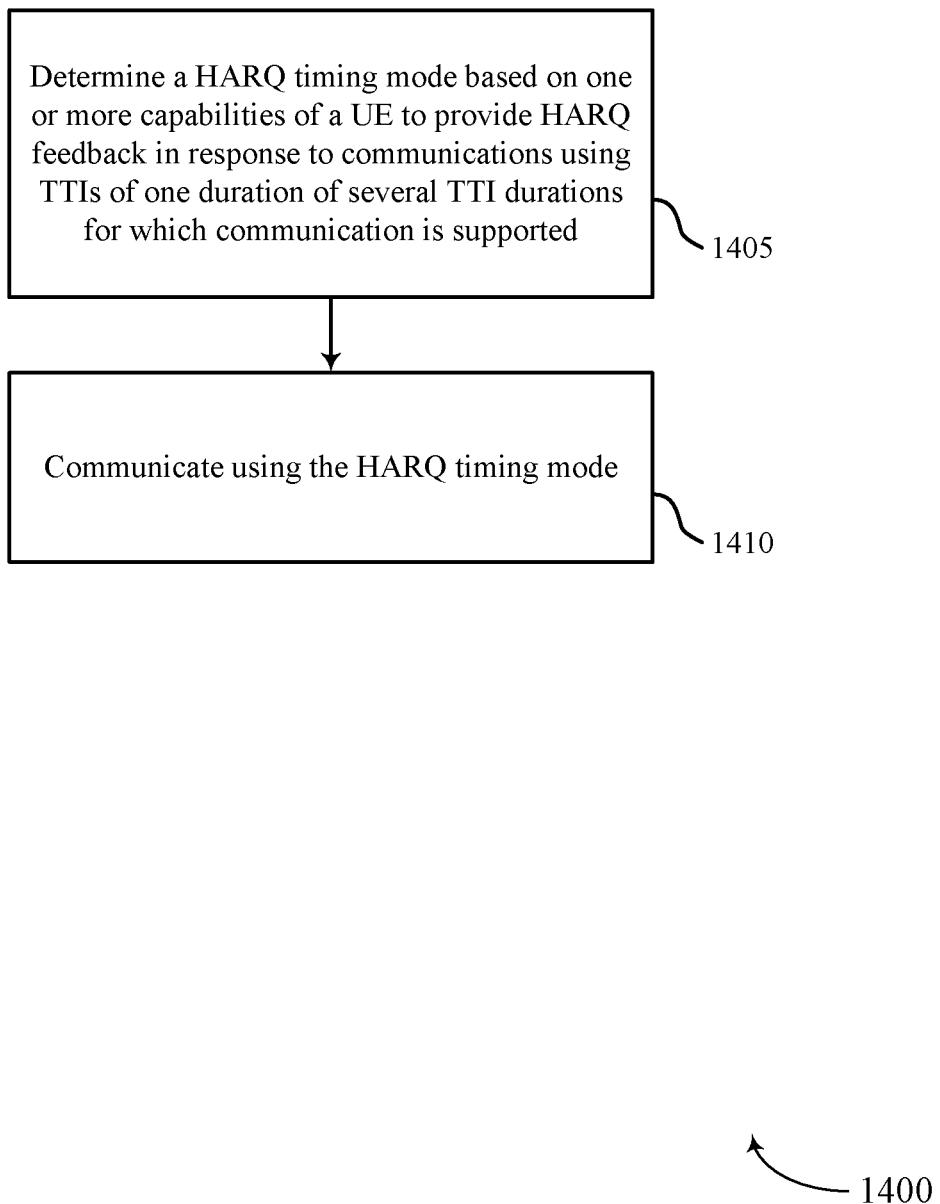
FIGS. 14 through 19 illustrate methods for HARQ timing for reduced TTIs in accordance with aspects of the present disclosure.

FIG. 14 shows a flowchart illustrating a method 1400 for HARQ timing for reduced TTIs in accordance with various aspects of the present disclosure. The operations of method 1400 may be implemented by a device such as a UE 115 or base station 105 or its components as described with reference to FIGS. 1 and 2. For example, the operations of method 1400 may be performed by the HARQ timing manager as described herein. In some examples, the UE 115 or base station 105 may execute a set of codes to control the functional elements of the device to perform the functions described below. Additionally or alternatively, the UE 115 or base station 105 may perform aspects of functions described below using special-purpose hardware.

At block 1405, the UE 115 or base station 105 operating in a system that supports communications using TTIs of a first duration and a second duration may determine a HARQ timing mode based on one or more capabilities of a UE to provide HARQ feedback in response to communications using TTIs of the second duration as described above with reference to FIGS. 2 through 8. In certain examples, the operations of block 1405 may be performed by the HARQ timing mode component as described with reference to FIGS. 10 and 11.

At block 1410, the UE 115 or base station 105 may communicate using the HARQ timing mode as described above with reference to FIGS. 2 through 8. In certain examples, the operations of block 1410 may be performed by the low latency communication component as described with reference to FIGS. 10 and 11 or the transceivers 1225 or 1325 as described with reference to FIGS. 12 and 13.

Figure 15:
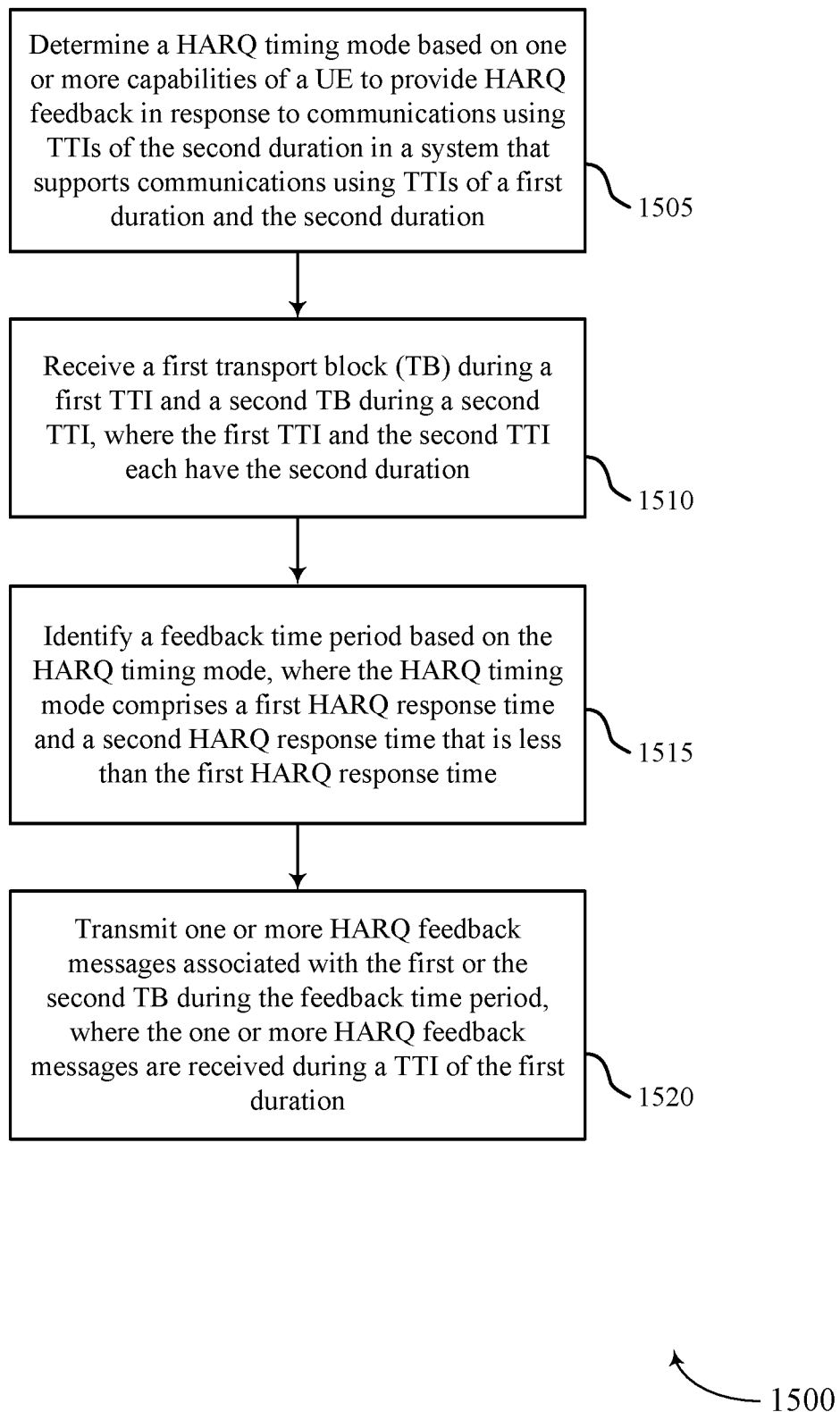

FIG. 15 shows a flowchart illustrating a method 1500 for HARQ timing for reduced TTIs in accordance with various aspects of the present disclosure. The operations of method 1500 may be implemented by a device such as a UE 115 or its components as described with reference to FIGS. 1 and 2. For example, the operations of method 1500 may be performed by the HARQ timing manager as described herein. In some examples, the UE 115 may execute a set of codes to control the functional elements of the device to perform the functions described below. Additionally or alternatively, the UE 115 may perform aspects of the functions described below using special-purpose hardware.

At block 1505, the UE 115 operating in a system that supports communications using TTIs of a first duration and a second duration may determine a HARQ timing mode based on one or more capabilities of a UE to provide HARQ feedback in response to communications using TTIs of the second duration as described above with reference to FIGS. 2 through 8. In certain examples, the operations of block 1505 may be performed by the HARQ timing mode component as described with reference to FIGS. 10 and 11.

At block 1510, the UE 115 may communicate using the HARQ timing mode as described above with reference to FIGS. 2 through 8. In some cases, the communicating includes receiving a first TB during a first TTI and a second TB during a second TTI, where the first TTI and the second TTI each have the second duration. In certain examples, the operations of block 1510 may be performed by the low latency communication component as described with reference to FIGS. 10 and 11 or the transceiver 1225 as described with reference to FIG. 12.

At block 1515, the UE 115 may identify a feedback time period based on the HARQ timing mode, where the HARQ timing mode includes a first HARQ response time and a second HARQ response time that is less than the first HARQ response time as described above with reference to FIGS. 2 through 8. In certain examples, the operations of block 1515 may be performed by the feedback time period component as described with reference to FIGS. 10 and 11.

At block 1520, the UE 115 may transmit one or more HARQ feedback messages associated with the first or the second TB during the feedback time period, where the one or more HARQ feedback messages are received during a TTI of the first duration as described above with reference to FIGS. 2 through 8. In certain examples, the operations of block 1520 may be performed by the HARQ feedback component as described with reference to FIGS. 10 and 11 or the transceiver 1225 as described with reference to FIG. 12.

Figure 16:
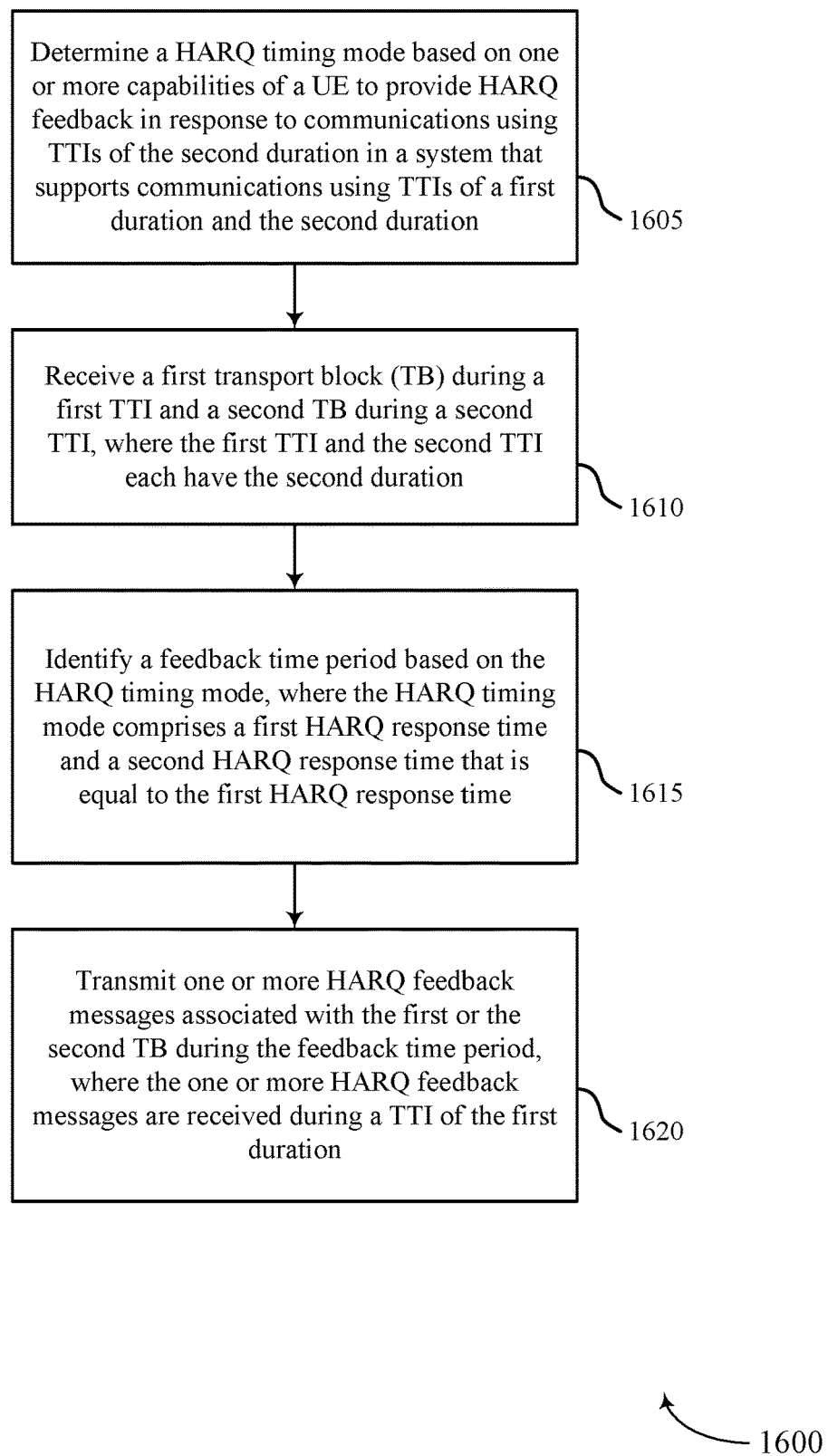

FIG. 16 shows a flowchart illustrating a method 1600 for HARQ timing for reduced TTIs in accordance with various aspects of the present disclosure. The operations of method 1600 may be implemented by a device such as a UE 115 or its components as described with reference to FIGS. 1 and 2. For example, the operations of method 1600 may be performed by the HARQ timing manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 operating in a system that supports communications using TTIs of a first duration and a second duration may determine a HARQ timing mode based on one or more capabilities of a UE to provide HARQ feedback in response to communications using TTIs of the second duration as described above with reference to FIGS. 2 through 8. In certain examples, the operations of block 1605 may be performed by the HARQ timing mode component as described with reference to FIGS. 10 and 11.

At block 1610, the UE 115 may communicate using the HARQ timing mode as described above with reference to FIGS. 2 through 8. In some cases, the communicating includes receiving a first TB during a first TTI and a second TB during a second TTI, where the first TTI and the second TTI each have the second duration. In certain examples, the operations of block 1610 may be performed by the low latency communication component as described with reference to FIGS. 10 and 11 or the transceivers 1225 as described with reference to FIG. 12.

At block 1615, the UE 115 may identify a feedback time period based on the HARQ timing mode, where the HARQ timing mode includes a first HARQ response time and a second HARQ response time that is equal to the first HARQ response time as described above with reference to FIGS. 2 through 8. In certain examples, the operations of block 1615 may be performed by the feedback time period component as described with reference to FIGS. 10 and 11.

At block 1620, the UE 115 may transmit one or more HARQ feedback messages associated with the first or the second TB during the feedback time period, where the one or more HARQ feedback messages are received during a TTI of the first duration as described above with reference to FIGS. 2 through 8. In certain examples, the operations of block 1620 may be performed by the HARQ feedback component as described with reference to FIGS. 10 and 11 or the transceiver 1225 as described with reference to FIG. 12.

Figure 17:
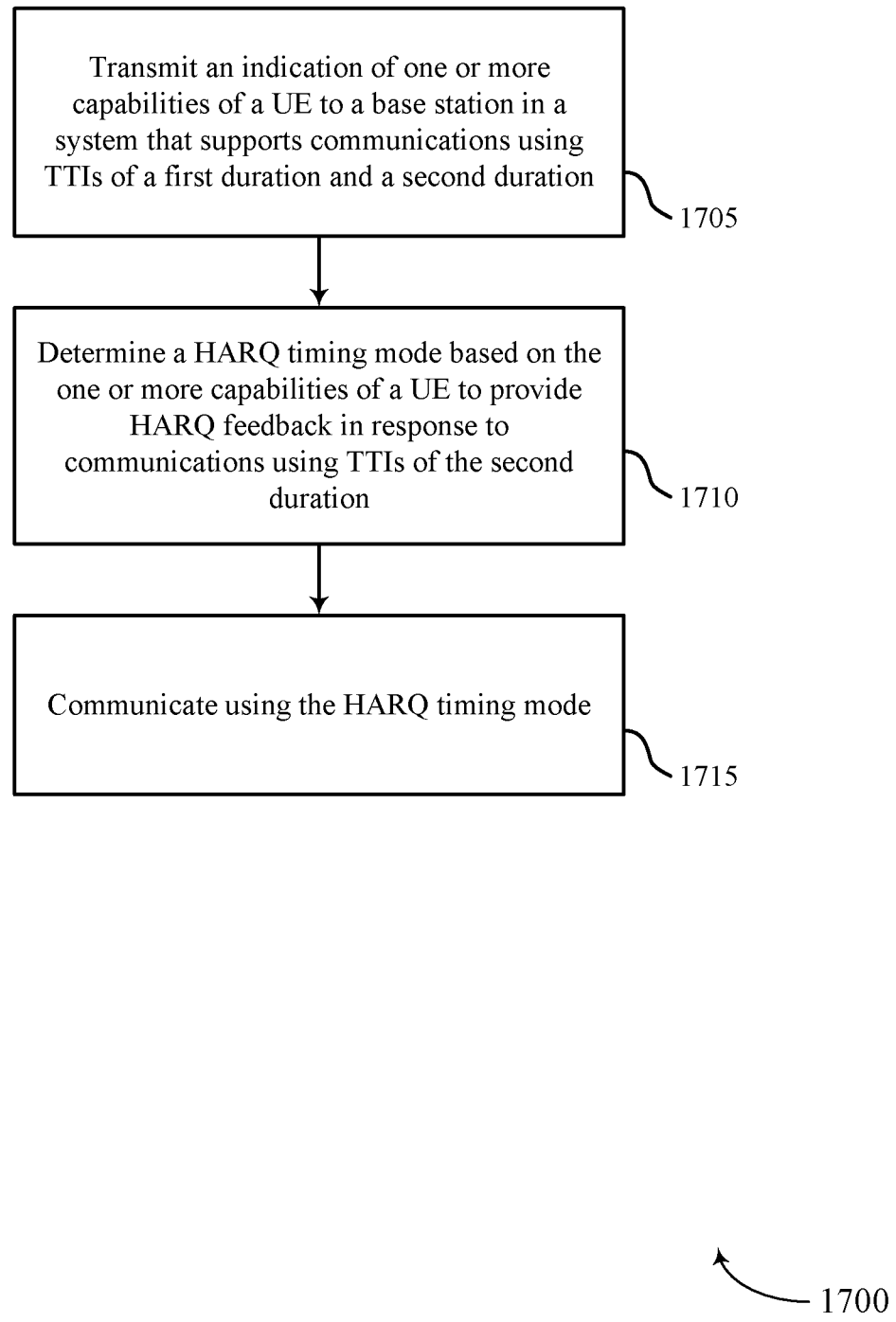

FIG. 17 shows a flowchart illustrating a method 1700 for HARQ timing for reduced TTIs in accordance with various aspects of the present disclosure. The operations of method 1700 may be implemented by a device such as a UE 115 or its components as described with reference to FIGS. 1 and 2. For example, the operations of method 1700 may be performed by the HARQ timing manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 operating in a system that supports communications using TTIs of a first duration and a second duration may transmit an indication of the one or more capabilities of a UE to a base station as described above with reference to FIGS. 2 through 8. In certain examples, the operations of block 1705 may be performed by the HARQ timing mode component as described with reference to FIGS. 10 and 11.

At block 1710, the UE 115 may determine a HARQ timing mode based on one or more capabilities of a UE to provide HARQ feedback in response to communications using TTIs of the second duration as described above with reference to FIGS. 2 through 8. In certain examples, the operations of block 1710 may be performed by the HARQ timing mode component as described with reference to FIGS. 10 and 11.

At block 1715, the UE 115 may communicate using the HARQ timing mode as described above with reference to FIGS. 2 through 8. In certain examples, the operations of block 1715 may be performed by the low latency communication component as described with reference to FIGS. 10 and 11 or the transceiver 1225 as described with reference to FIG. 12.

Figure 18:
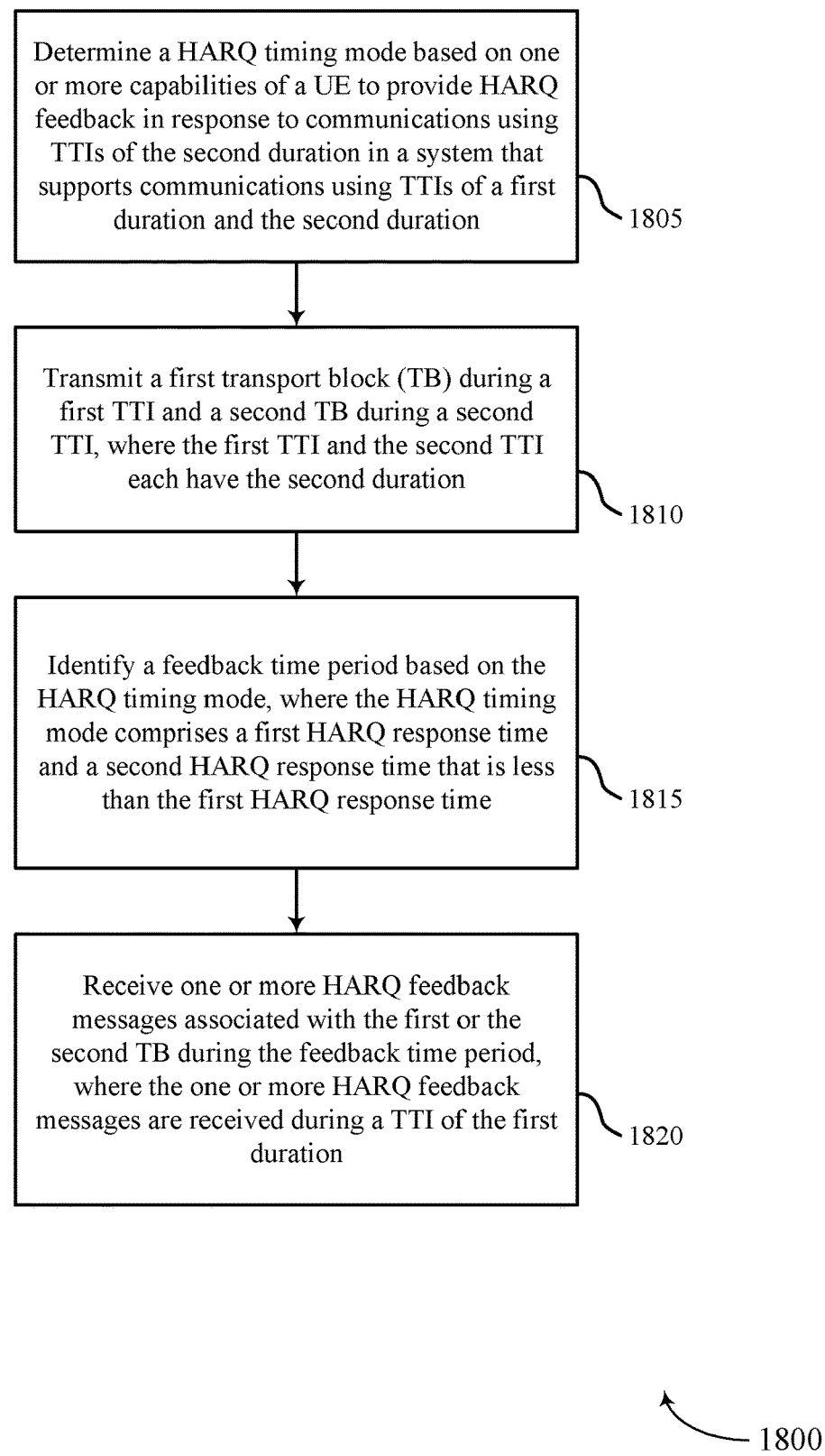

FIG. 18 shows a flowchart illustrating a method 1800 for HARQ timing for reduced TTIs in accordance with various aspects of the present disclosure. The operations of method 1800 may be implemented by a device such as a base station 105 or its components as described with reference to FIGS. 1 and 2. For example, the operations of method 1800 may be performed by the HARQ timing manager as described herein. In some examples, the base station 105 may execute a set of codes to control the functional elements of the device to perform the functions described below. Additionally or alternatively, the base station 105 may perform aspects the functions described below using special-purpose hardware.

At block 1805, the base station 105 operating in a system that supports communications using TTIs of a first duration and a second duration may determine a HARQ timing mode based on one or more capabilities of a UE to provide HARQ feedback in response to communications using TTIs of the second duration as described above with reference to FIGS. 2 through 8. In certain examples, the operations of block 1805 may be performed by the HARQ timing mode component as described with reference to FIGS. 10 and 11.

At block 1810, the base station 105 may communicate using the HARQ timing mode as described above with reference to FIGS. 2 through 8. In some cases, the communicating includes transmitting a first TB during a first TTI and a second TB during a second TTI, where the first TTI and the second TTI each have the second duration. In certain examples, the operations of block 1810 may be performed by the low latency communication component as described with reference to FIGS. 10 and 11 or the transceiver 1325 as described with reference to FIG. 13.

At block 1815, the base station 105 may identify a feedback time period based on the HARQ timing mode, where the HARQ timing mode includes a first HARQ response time and a second HARQ response time that is less than the first HARQ response time as described above with reference to FIGS. 2 through 8. In certain examples, the operations of block 1815 may be performed by the feedback time period component as described with reference to FIGS. 10 and 11.

At block 1820, the base station 105 may receive one or more HARQ feedback messages associated with the first or the second TB during the feedback time period, where the one or more HARQ feedback messages are received during a TTI of the first duration as described above with reference to FIGS. 2 through 8. In certain examples, the operations of block 1820 may be performed by the HARQ feedback component as described with reference to FIGS. 10 and 11 or the transceiver 1325 as described with reference to FIG. 13.

Figure 19:
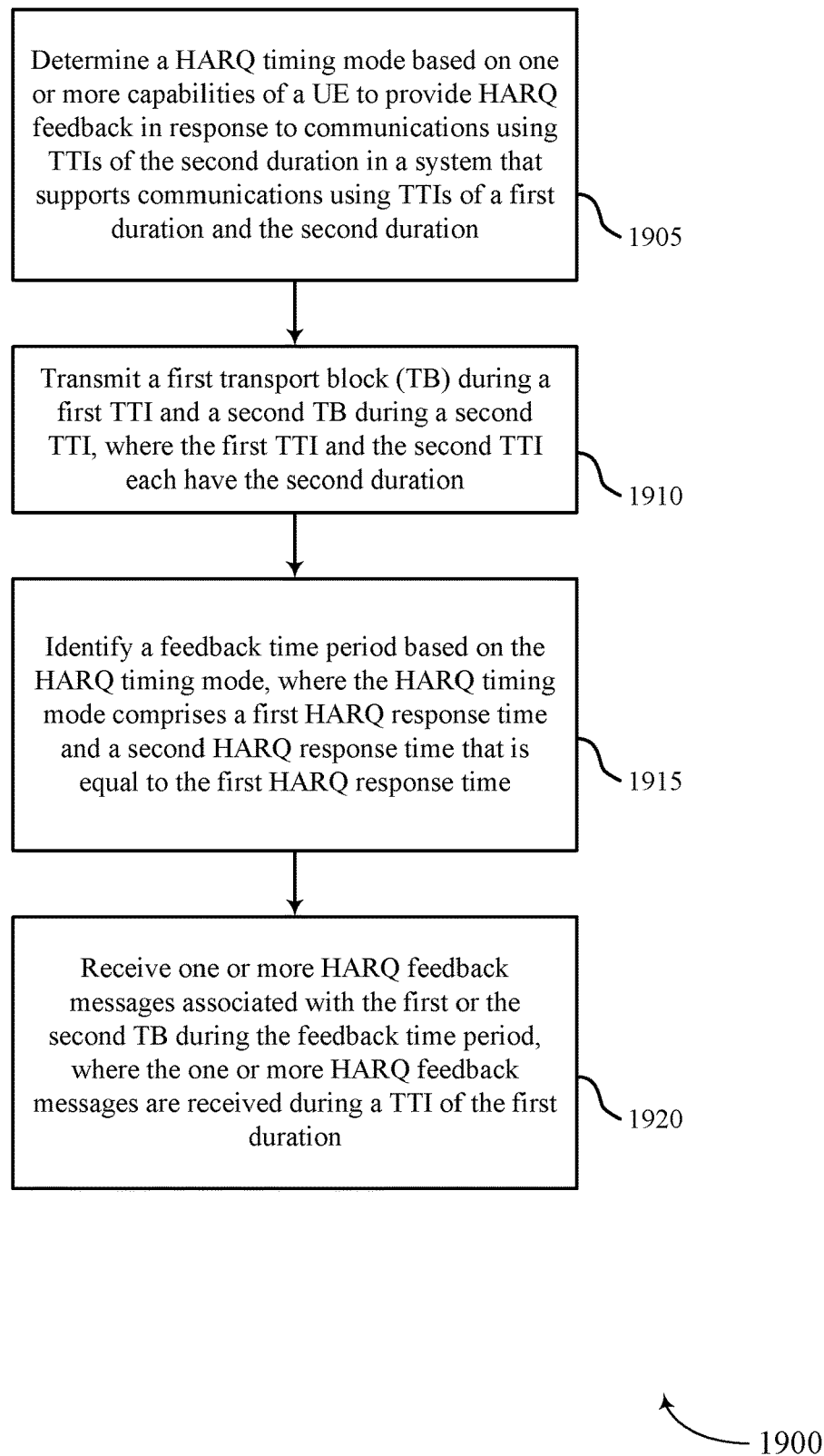

FIG. 19 shows a flowchart illustrating a method 1900 for HARQ timing for reduced TTIs in accordance with various aspects of the present disclosure. The operations of method 1900 may be implemented by a device such as a base station 105 or its components as described with reference to FIGS. 1 and 2. For example, the operations of method 1900 may be performed by the HARQ timing manager as described herein. In some examples, the base station 105 may execute a set of codes to control the functional elements of the device to perform the functions described below. Additionally or alternatively, the base station 105 may perform aspects the functions described below using special-purpose hardware.

At block 1905, the base station 105 operating in a system that supports communications using TTIs of a first duration and a second duration may determine a HARQ timing mode based on one or more capabilities of a UE to provide HARQ feedback in response to communications using TTIs of the second duration as described above with reference to FIGS. 2 through 8. In certain examples, the operations of block 1905 may be performed by the HARQ timing mode component as described with reference to FIGS. 10 and 11.

At block 1910, the base station 105 may communicate using the HARQ timing mode as described above with reference to FIGS. 2 through 8. In some cases, the communicating includes transmitting a first TB during a first TTI and a second TB during a second TTI, where the first TTI and the second TTI each have the second duration. In certain examples, the operations of block 1910 may be performed by the low latency communication component as described with reference to FIGS. 10 and 11 or the transceiver 1325 as described with reference to FIG. 13.

At block 1915, the base station 105 may identify a feedback time period based on the HARQ timing mode, where the HARQ timing mode includes a first HARQ response time and a second HARQ response time that is equal to the first HARQ response time as described above with reference to FIGS. 2 through 8. In certain examples, the operations of block 1915 may be performed by the feedback time period component as described with reference to FIGS. 10 and 11.

At block 1920, the base station 105 may receive one or more HARQ feedback messages associated with the first or the second TB during the feedback time period, where the one or more HARQ feedback messages are received during a TTI of the first duration as described above with reference to FIGS. 2 through 8. In certain examples, the operations of block 1920 may be performed by the HARQ feedback component as described with reference to FIGS. 10 and 11 or the transceiver 1325 as described with reference to FIG. 13.

It should be noted that these methods and processes describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for HARQ timing for reduced TTIs.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for HARQ timing for reduced TTIs. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication in a system that supports transmission time intervals (TTIs) of a first duration and a second duration that is less than the first duration, comprising:
   determining a hybrid automatic repeat request (HARQ) timing mode based at least in part on one or more capabilities of a user equipment (UE) to provide HARQ feedback in response to communications using TTIs of the second duration; and
   communicating using the HARQ timing mode, the communicating comprising transmitting one or more HARQ feedback messages associated with a transport block (TB) in a TTI of the second duration during a feedback time period, wherein the one or more HARQ feedback messages are received during a TTI of the first duration.

2. The method of claim 1, wherein the communicating further comprises:
   receiving a first TB during a first TTI and a second TB during a second TTI, wherein the first TTI and the second TTI each have the second duration; and
   identifying the feedback time period based at least in part on the HARQ timing mode, wherein the HARQ timing mode comprises a first HARQ response time and a second HARQ response time that is less than the first HARQ response time.

3. The method of claim 1, wherein the communicating further comprises:

receiving a first TB during a first TTI and a second TB during a second TTI, wherein the first TTI and the second TTI each have the second duration; and
identifying the feedback time period based at least in part on the HARQ timing mode, wherein the HARQ timing mode comprises a first HARQ response time and a second HARQ response time that is equal to the first HARQ response time.

4. The method of claim 3, wherein the first TTI is within a latter part of a first time period having the first duration and the second TTI is within an initial part of a second time period having the first duration.

5. The method of claim 3, wherein the one or more HARQ feedback messages comprise a first HARQ feedback message and a second HARQ feedback message distinct from the first HARQ feedback message.

6. The method of claim 5, wherein a latter portion of the first HARQ feedback message and an initial portion of the second HARQ feedback message are multiplexed using at least one of:
a physical uplink control channel (PUCCH) format capable of carrying more than two bits,
a division of bits between the latter portion of the first HARQ feedback message and the initial portion of the second HARQ feedback message,
joint coding of one or more bits of the first HARQ feedback message and the second HARQ feedback message, or
a combination of bits based at least in part on an orthogonal cover code (OCC) and at least one parity bit,
or any combination thereof.

7. The method of claim 1, further comprising:
transmitting an indication of the one or more capabilities of the UE to a base station.

8. The method of claim 1, further comprising:
receiving an indication of a set of HARQ timing modes from a base station; and
transmitting a HARQ timing mode request in response to the indication, wherein the HARQ timing mode is selected from the set of HARQ timing modes based at least in part on the HARQ timing mode request.

9. The method of claim 1, wherein the communicating further comprises:
transmitting a first TB during a first TTI and a second TB during a second TTI, wherein the first TTI and the second TTI each have the second duration;
identifying the feedback time period based at least in part on the HARQ timing mode, wherein the HARQ timing mode comprises a first HARQ response time and a second HARQ response time that is less than the first HARQ response time; and
receiving one or more HARQ feedback messages associated with the first or the second TB during the feedback time period, wherein the one or more HARQ feedback messages are received during a TTI of the first duration.

10. The method of claim 1, wherein the communicating further comprises:
transmitting a first TB during a first TTI and a second TB during a second TTI, wherein the first TTI and the second TTI each have the second duration;
identifying the feedback time period based at least in part on the HARQ timing mode, wherein the HARQ timing mode comprises a first HARQ response time and a second HARQ response time that is equal to the first HARQ response time; and
receiving one or more HARQ feedback messages associated with the first or the second TB during the feedback time period, wherein the one or more HARQ feedback messages are received during a TTI of the first duration.

11. The method of claim 1, further comprising:
identifying an uplink (UL) control configuration based at least in part on the HARQ timing mode; and
transmitting an indication of the UL control configuration to the UE.

12. The method of claim 1, further comprising:
identifying a first physical uplink control channel (PUCCH) resource offset for UL transmissions that use TTIs of the first duration and a second PUCCH resource offset for UL transmissions that use TTIs of the second duration.

13. The method of claim 12, wherein the second PUCCH resource offset is identified based at least in part on the first PUCCH resource offset and a delta value.

14. The method of claim 12, wherein the first PUCCH resource offset or the second PUCCH resource offset is identified based at least in part on a PUCCH format.

15. The method of claim 14, wherein the one or more resource sets for UL transmissions are associated with each PUCCH format of a set of PUCCH formats, and wherein the one or more resource sets are each associated with a different base station or layer three configuration.

16. The method of claim 1, further comprising:
identifying a first scheduled downlink (DL) transmission indicator associated with TTIs of the first duration and a second scheduled DL transmission indicator associated with TTIs of the second duration.

17. The method of claim 1, wherein the first duration is a duration of one subframe and the second duration is a duration of one slot of a subframe.

18. The method of claim 1, further comprising:
indicating a set of transmissions of the second duration with a downlink assignment index (DAI).

19. The method of claim 1, wherein the communicating using the HARQ timing mode is performed over a shared channel or a control channel.

20. An apparatus for wireless communication in a system that supports transmission time intervals (TTIs) of a first duration and a second duration that is less than the first duration, comprising:
means for determining a hybrid automatic repeat request (HARQ) timing mode based at least in part on one or more capabilities of a user equipment (UE) to provide HARQ feedback in response to communications using TTIs of the second duration; and
means for communicating using the HARQ timing mode, the means for communicating comprising means for transmitting one or more HARQ feedback messages associated with a transport block (TB) in a TTI of the second duration during a feedback time period, wherein the one or more HARQ feedback messages are received during a TTI of the first duration.

21. An apparatus for wireless communication in a system that supports transmission time intervals (TTIs) of a first duration and a second duration that is less than the first duration, comprising:
a processor;
memory in electronic communication with the processor; and
instructions stored in the memory and operable, when executed by the processor, to cause the apparatus to:

determine a hybrid automatic repeat request (HARQ) timing mode based at least in part on one or more capabilities of a user equipment (UE) to provide HARQ feedback in response to communications using TTIs of the second duration; and communicate using the HARQ timing mode by transmitting one or more HARQ feedback messages associated with a transport block (TB) in a TTI of the second duration during a feedback time period, wherein the one or more HARQ feedback messages are received during a TTI of the first duration.

22. The apparatus of claim 21, wherein the instructions causing the apparatus to communicate using the HARQ timing mode are further executable to:

receive a first TB during a first TTI and a second TB during a second TTI, wherein the first TTI and the second TTI each have the second duration; and identify the feedback time period based at least in part on the HARQ timing mode, wherein the HARQ timing mode comprises a first HARQ response time and a second HARQ response time that is less than the first HARQ response time.

23. The apparatus of claim 21, wherein the instructions causing the apparatus to communicate using the HARQ timing mode are further executable to:

receive a first TB during a first TTI and a second TB during a second TTI, wherein the first TTI and the second TTI each have the second duration; and identify the feedback time period based at least in part on the HARQ timing mode, wherein the HARQ timing mode comprises a first HARQ response time and a second HARQ response time that is equal to the first HARQ response time.

24. The apparatus of claim 23, wherein the first TTI is within a latter part of a first time period having the first duration and the second TTI is within an initial part of a second time period having the first duration.

25. The apparatus of claim 23, wherein the one or more HARQ feedback messages comprise a first HARQ feedback message and a second HARQ feedback message distinct from the first HARQ feedback message.

26. The apparatus of claim 25, wherein a latter portion of the first HARQ feedback message and an initial portion of the second HARQ feedback message are multiplexed using at least one of:

a physical uplink control channel (PUCCH) format capable of carrying more than two bits, a division of bits between the latter portion of the first HARQ feedback message and the initial portion of the second HARQ feedback message, joint coding of one or more bits of the first HARQ feedback message and the second HARQ feedback message, or a combination of bits based at least in part on an orthogonal cover code (OCC) and at least one parity bit, or any combination thereof.

27. The apparatus of claim 21, wherein the instructions are further executable by the processor to:

transmit an indication of the one or more capabilities of the UE to a base station.

28. The apparatus of claim 21, wherein the instructions are further executable by the processor to:

receive an indication of a set of HARQ timing modes from a base station; and transmit a HARQ timing mode request in response to the indication, wherein the HARQ timing mode is selected from the set of HARQ timing modes based at least in part on the HARQ timing mode request.

29. The apparatus of claim 21, wherein the instructions causing the apparatus to communicate using the HARQ timing mode are further executable to:

transmit a first TB during a first TTI and a second TB during a second TTI, wherein the first TTI and the second TTI each have the second duration;

identify the feedback time period based at least in part on the HARQ timing mode, wherein the HARQ timing mode comprises a first HARQ response time and a second HARQ response time that is less than the first HARQ response time; and receive one or more HARQ feedback messages associated with the first or the second TB during the feedback time period, wherein the one or more HARQ feedback messages are received during a TTI of the first duration.

30. A non-transitory computer-readable medium storing code for wireless communication in a system that supports transmission time intervals (TTIs) of a first duration and a second duration that is less than the first duration, the code comprising instructions executable to:

determine a hybrid automatic repeat request (HARQ) timing mode based at least in part on one or more capabilities of a user equipment (UE) to provide HARQ feedback in response to communications using TTIs of the second duration; and communicate using the HARQ timing mode by transmitting one or more HARQ feedback messages associated with a transport block (TB) in a TTI of the second duration during a feedback time period, wherein the one or more HARQ feedback messages are received during a TTI of the first duration.

* * * * *